(12) United States Patent
Hansen

(10) Patent No.: US 9,710,856 B2
(45) Date of Patent: *Jul. 18, 2017

(54) SYSTEM AND METHOD FOR ADAPTING MARKET DATA AND EVALUATING UNEQUAL OFFERS

(71) Applicant: BuyMetrics, Inc., Atlanta, GA (US)

(72) Inventor: Valerie Hansen, Racine, WI (US)

(73) Assignee: BuyMetrics, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,641

(22) Filed: Feb. 28, 2017

(65) Prior Publication Data

US 2017/0169514 A1 Jun. 15, 2017

Related U.S. Application Data

(63) Continuation of application No. 15/368,266, filed on Dec. 2, 2016, which is a continuation of application (Continued)

(51) Int. Cl.
*G06Q 40/04* (2012.01)

(52) U.S. Cl.
CPC .................... *G06Q 40/04* (2013.01)

(58) Field of Classification Search
None
See application file for complete search history.

(56) References Cited

U.S. PATENT DOCUMENTS

| 1,927,702 | A | 9/1933 | Foss |
|---|---|---|---|
| 3,581,072 | A | 5/1971 | Nymeyer |
| 3,933,305 | A | 1/1976 | Murphy |
| 4,412,287 | A | 10/1983 | Braddock, III |
| 4,486,853 | A | 12/1984 | Parsons |
| 4,674,044 | A | 6/1987 | Kalmus et al. |
| 4,868,866 | A | 9/1989 | Williams, Jr. |
| 4,903,201 | A | 2/1990 | Wagner |
| 4,972,504 | A | 11/1990 | Daniel, Jr. et al. |
| 4,992,940 | A | 2/1991 | Dworkin |
| 5,063,506 | A | 11/1991 | Brockwell et al. |
| 5,077,665 | A | 12/1991 | Silverman et al. |
| 5,101,353 | A | 3/1992 | Lupien et al. |
| 5,136,501 | A | 8/1992 | Silverman et al. |
| 5,168,446 | A | 12/1992 | Wiseman |

(Continued)

FOREIGN PATENT DOCUMENTS

| EP | 0 407 026 A2 | 1/1991 |
|---|---|---|
| JP | 62-139088 A | 6/1987 |

(Continued)

OTHER PUBLICATIONS

Böer et al., "Target Costing Can Boost Your Bottom Line," *Strategic Finance* 81(1):49-52, Jul. 1999.

(Continued)

*Primary Examiner* — Robert R Niquette
(74) *Attorney, Agent, or Firm* — Seed IP Law Group LLP

(57) ABSTRACT

A system includes at least one server that implements a metric server adapter and a metrics application. The metric server adapter includes governing logic that manages an evaluation service and predefined instructions and/or data used to provide the evaluation service. The metrics application executes the evaluation service in coordination with the metric server adapter. The server receives or retrieves price data sets, at least one of which represents an unequal offer. The metrics application obtains time-dependent metric data including market reference price data for one or more responsive items, dynamically discovers a difference in the attribute data, and defines offer-specific instructions for adapting the metric data. One or more adjustment values applied to the market reference price data transforms the market reference price data. A comparative metric comprising a differential ratio or index value compares the price data in the offer with the offer-specific market reference price data values.

45 Claims, 13 Drawing Sheets

Related U.S. Application Data

No. 15/257,765, filed on Sep. 6, 2016, now Pat. No. 9,576,296, which is a continuation of application No. 15/237,518, filed on Aug. 15, 2016, now Pat. No. 9,524,495, which is a continuation of application No. 14/740,630, filed on Jun. 16, 2015, now Pat. No. 9,418,371, which is a continuation of application No. 14/262,682, filed on Apr. 25, 2014, now Pat. No. 9,092,825, which is a continuation of application No. 13/869,942, filed on Apr. 24, 2013, now Pat. No. 8,762,258, which is a continuation of application No. 13/597,200, filed on Aug. 28, 2012, now Pat. No. 8,442,888, which is a continuation of application No. 13/475,900, filed on May 18, 2012, now Pat. No. 8,321,317, which is a continuation of application No. 13/118,351, filed on May 27, 2011, now Pat. No. 8,224,729, which is a continuation of application No. 12/952,083, filed on Nov. 22, 2010, now Pat. No. 7,966,240, which is a continuation of application No. 11/394,540, filed on Mar. 31, 2006, now Pat. No. 7,840,462, which is a continuation of application No. 09/607,502, filed on Jun. 28, 2000, now Pat. No. 7,043,457.

(56) References Cited

U.S. PATENT DOCUMENTS

| | | |
|---|---|---|
| 5,172,314 A | 12/1992 | Poland et al. |
| 5,201,047 A | 4/1993 | Maki et al. |
| 5,249,120 A | 9/1993 | Foley |
| 5,293,479 A | 3/1994 | Quitero et al. |
| 5,297,031 A | 3/1994 | Gutterman et al. |
| 5,375,055 A | 12/1994 | Togher et al. |
| 5,414,621 A | 5/1995 | Hough |
| 5,418,943 A | 5/1995 | Borgida et al. |
| 5,446,874 A | 8/1995 | Waclawsky et al. |
| 5,486,995 A | 1/1996 | Krist et al. |
| 5,500,793 A | 3/1996 | Deming, Jr. et al. |
| 5,515,524 A | 5/1996 | Lynch et al. |
| 5,555,403 A | 9/1996 | Cambot et al. |
| 5,675,785 A | 10/1997 | Hall et al. |
| 5,715,402 A | 2/1998 | Popolo |
| 5,726,914 A | 3/1998 | Janovski et al. |
| 5,727,165 A | 3/1998 | Ordish et al. |
| 5,732,271 A | 3/1998 | Berry et al. |
| 5,732,400 A | 3/1998 | Mandler et al. |
| 5,758,328 A | 5/1998 | Giovannoli |
| 5,761,389 A | 6/1998 | Maeda et al. |
| 5,764,916 A | 6/1998 | Busey et al. |
| 5,771,370 A | 6/1998 | Klein |
| 5,774,879 A | 6/1998 | Custy et al. |
| 5,794,207 A | 8/1998 | Walker et al. |
| 5,799,300 A | 8/1998 | Agrawal et al. |
| 5,809,483 A | 9/1998 | Broka et al. |
| 5,822,751 A | 10/1998 | Gray et al. |
| 5,825,651 A | 10/1998 | Gupta et al. |
| 5,835,896 A | 11/1998 | Fisher et al. |
| 5,842,178 A | 11/1998 | Giovannoli |
| 5,845,266 A | 12/1998 | Lupien et al. |
| 5,857,174 A | 1/1999 | Dugan |
| 5,873,069 A | 2/1999 | Reuhl et al. |
| 5,873,071 A | 2/1999 | Ferstenberg et al. |
| 5,909,543 A | 6/1999 | Tanaka et al. |
| 5,924,082 A | 7/1999 | Silverman et al. |
| 5,924,083 A | 7/1999 | Silverman et al. |
| 5,937,393 A | 8/1999 | O'Leary et al. |
| 5,950,176 A | 9/1999 | Keiser et al. |
| 5,960,411 A | 9/1999 | Hartman et al. |
| 5,963,910 A | 10/1999 | Ulwick |
| 5,987,435 A | 11/1999 | Weiss et al. |
| 5,991,696 A | 11/1999 | McAndrew |
| 5,999,940 A | 12/1999 | Ranger |
| 6,012,046 A | 1/2000 | Lupien et al. |
| 6,014,647 A | 1/2000 | Nizzari et al. |
| 6,023,683 A | 2/2000 | Johnson et al. |
| 6,034,652 A | 3/2000 | Freiberger et al. |
| 6,035,287 A | 3/2000 | Stallaert et al. |
| 6,038,537 A | 3/2000 | Matsuoka |
| 6,038,540 A | 3/2000 | Krist et al. |
| 6,049,822 A | 4/2000 | Mittal |
| 6,055,516 A | 4/2000 | Johnson et al. |
| 6,055,518 A | 4/2000 | Franklin et al. |
| 6,058,379 A | 5/2000 | Odom et al. |
| 6,061,662 A | 5/2000 | Makivic |
| 6,064,982 A | 5/2000 | Puri |
| 6,076,070 A * | 6/2000 | Stack .................... G06Q 30/06 235/375 |
| 6,078,924 A | 6/2000 | Ainsbury et al. |
| 6,085,164 A | 7/2000 | Smith et al. |
| 6,085,196 A | 7/2000 | Motoyama et al. |
| 6,094,651 A | 7/2000 | Agrawal et al. |
| 6,125,391 A | 9/2000 | Meltzer et al. |
| 6,134,536 A | 10/2000 | Shepherd |
| 6,134,548 A | 10/2000 | Gottsman et al. |
| 6,141,653 A | 10/2000 | Conklin et al. |
| 6,161,103 A | 12/2000 | Rauer et al. |
| 6,163,774 A | 12/2000 | Lore et al. |
| 6,167,383 A | 12/2000 | Henson |
| 6,175,619 B1 | 1/2001 | DeSimone |
| 6,205,447 B1 | 3/2001 | Malloy |
| 6,223,164 B1 | 4/2001 | Seare et al. |
| 6,233,609 B1 | 5/2001 | Mittal |
| 6,260,024 B1 | 7/2001 | Shkedy |
| 6,278,982 B1 | 8/2001 | Korhammer et al. |
| 6,282,521 B1 | 8/2001 | Howorka |
| 6,285,997 B1 | 9/2001 | Carey et al. |
| 6,308,199 B1 | 10/2001 | Katsurabayashi |
| 6,311,144 B1 | 10/2001 | Abu El Ata |
| 6,317,728 B1 | 11/2001 | Kane |
| 6,336,105 B1 | 1/2002 | Conklin et al. |
| 6,339,775 B1 | 1/2002 | Zamanian et al. |
| 6,339,776 B2 | 1/2002 | Dayani-Fard et al. |
| 6,341,277 B1 | 1/2002 | Coden et al. |
| 6,347,307 B1 | 2/2002 | Sandhu et al. |
| 6,381,605 B1 | 4/2002 | Kothuri et al. |
| 6,385,604 B1 | 5/2002 | Bakalash et al. |
| 6,389,407 B1 | 5/2002 | Paradis et al. |
| 6,408,282 B1 | 6/2002 | Buist |
| 6,411,936 B1 | 6/2002 | Sanders |
| 6,415,263 B1 | 7/2002 | Doss |
| 6,442,533 B1 | 8/2002 | Hinkle |
| 6,460,020 B1 | 10/2002 | Pool et al. |
| 6,460,077 B2 | 10/2002 | Mittal |
| 6,477,536 B1 | 11/2002 | Pasumansky et al. |
| 6,484,158 B1 | 11/2002 | Johnson et al. |
| 6,505,172 B1 | 1/2003 | Johnson et al. |
| 6,505,174 B1 | 1/2003 | Keiser et al. |
| 6,505,175 B1 | 1/2003 | Silverman et al. |
| 6,510,434 B1 | 1/2003 | Anderson et al. |
| 6,535,880 B1 | 3/2003 | Musgrove et al. |
| 6,535,913 B2 | 3/2003 | Mittal et al. |
| 6,546,402 B1 | 4/2003 | Beyer et al. |
| 6,549,908 B1 | 4/2003 | Loomans |
| 6,553,346 B1 | 4/2003 | Walker et al. |
| 6,556,976 B1 | 4/2003 | Callen |
| 6,564,192 B1 | 5/2003 | Kinney, Jr. et al. |
| 6,609,098 B1 | 8/2003 | DeMarcken |
| 6,618,707 B1 | 9/2003 | Gary |
| 6,618,714 B1 | 9/2003 | Abrahams |
| 6,629,082 B1 | 9/2003 | Hambrecht et al. |
| 6,654,747 B1 | 11/2003 | Van Huben et al. |
| 6,662,174 B2 | 12/2003 | Shah et al. |
| 6,677,963 B1 | 1/2004 | Mani et al. |
| 6,714,933 B2 | 3/2004 | Musgrove et al. |
| 6,725,257 B1 | 4/2004 | Cansler et al. |
| 6,778,863 B1 | 8/2004 | Lienhard et al. |
| 6,778,993 B2 | 8/2004 | Wang |
| 6,792,458 B1 | 9/2004 | Muret et al. |
| 6,807,565 B1 | 10/2004 | Dodrill et al. |
| 6,847,938 B1 | 1/2005 | Moore |
| 6,850,900 B1 | 2/2005 | Hare et al. |

(56) References Cited

U.S. PATENT DOCUMENTS

| | | |
|---|---|---|
| 6,856,967 B1 | 2/2005 | Woolston et al. |
| 6,865,524 B1 | 3/2005 | Shah et al. |
| 6,907,404 B1 | 6/2005 | Li |
| 6,941,280 B1 | 9/2005 | Gastineau et al. |
| 6,963,854 B1* | 11/2005 | Boyd ................ G06Q 30/0283 |
| | | 705/1.1 |
| 6,976,006 B1 | 12/2005 | Verma et al. |
| 6,990,238 B1 | 1/2006 | Saffer et al. |
| 6,993,504 B1 | 1/2006 | Friesen et al. |
| 7,003,486 B1 | 2/2006 | Condamoor et al. |
| 7,010,494 B2 | 3/2006 | Etzioni et al. |
| 7,010,511 B1 | 3/2006 | Kinney, Jr. et al. |
| 7,024,376 B1 | 4/2006 | Yuen |
| 7,024,383 B1 | 4/2006 | Mancini et al. |
| 7,031,901 B2 | 4/2006 | Abu El Ata |
| 7,035,815 B1 | 4/2006 | Henson |
| 7,039,040 B1 | 5/2006 | Burg |
| 7,043,457 B1 | 5/2006 | Hansen |
| 7,043,464 B2 | 5/2006 | Abrahams |
| 7,051,071 B2 | 5/2006 | Stewart et al. |
| 7,058,598 B1 | 6/2006 | Chen et al. |
| 7,072,857 B1 | 7/2006 | Calonge |
| 7,080,033 B2 | 7/2006 | Wilton et al. |
| 7,107,226 B1 | 9/2006 | Cassidy et al. |
| 7,107,230 B1 | 9/2006 | Halbert et al. |
| 7,113,919 B1 | 9/2006 | Norris et al. |
| 7,124,106 B1 | 10/2006 | Stallaert et al. |
| 7,133,835 B1 | 11/2006 | Fusz et al. |
| 7,133,848 B2 | 11/2006 | Phillips et al. |
| 7,149,717 B1* | 12/2006 | Kan ................ G06Q 30/00 |
| | | 705/35 |
| 7,165,042 B1 | 1/2007 | Segal et al. |
| 7,171,386 B1 | 1/2007 | Raykhman |
| 7,181,424 B1 | 2/2007 | Ketchum et al. |
| 7,200,583 B1 | 4/2007 | Shah et al. |
| 7,203,661 B1 | 4/2007 | Graff |
| 7,206,756 B1 | 4/2007 | Walsky |
| 7,212,996 B1 | 5/2007 | Carnahan et al. |
| 7,212,997 B1 | 5/2007 | Pine et al. |
| 7,212,999 B2 | 5/2007 | Friesen et al. |
| 7,216,092 B1 | 5/2007 | Weber et al. |
| 7,225,150 B2 | 5/2007 | Wilton et al. |
| 7,231,612 B1 | 6/2007 | Mani et al. |
| 7,233,923 B1 | 6/2007 | Wallace et al. |
| 7,246,092 B1 | 7/2007 | Peterson et al. |
| 7,249,085 B1 | 7/2007 | Kinney, Jr. et al. |
| 7,251,629 B1 | 7/2007 | Marynowski et al. |
| 7,283,979 B2 | 10/2007 | Tulloch et al. |
| 7,296,001 B1 | 11/2007 | Ephrati et al. |
| 7,315,838 B2 | 1/2008 | Gershon |
| 7,346,574 B2 | 3/2008 | Smith et al. |
| 7,373,317 B1 | 5/2008 | Kopelman et al. |
| 7,373,319 B2 | 5/2008 | Kopelman et al. |
| 7,379,898 B2 | 5/2008 | Tenorio |
| 7,383,206 B2 | 6/2008 | Rupp et al. |
| 7,386,497 B1 | 6/2008 | Gooch |
| 7,389,211 B2 | 6/2008 | Abu El Ata et al. |
| 7,392,214 B1 | 6/2008 | Fraser et al. |
| 7,424,452 B2 | 9/2008 | Feilbogen et al. |
| 7,430,531 B1 | 9/2008 | Snyder |
| 7,447,653 B1 | 11/2008 | Watanabe et al. |
| 7,467,110 B2 | 12/2008 | Müller et al. |
| 7,472,087 B2 | 12/2008 | Keith |
| 7,509,261 B1 | 3/2009 | McManus et al. |
| 7,509,283 B2 | 3/2009 | Friesen et al. |
| 7,536,335 B1 | 5/2009 | Weston et al. |
| 7,552,095 B2 | 6/2009 | Kalyan |
| 7,562,047 B2 | 7/2009 | Friesen et al. |
| 7,577,582 B1 | 8/2009 | Ojha et al. |
| 7,577,606 B1 | 8/2009 | Ford |
| 7,584,144 B2 | 9/2009 | Friesen et al. |
| 7,603,286 B2 | 10/2009 | Ouimet |
| 7,653,583 B1 | 1/2010 | Leeb et al. |
| 7,660,738 B1 | 2/2010 | Siegel et al. |
| 7,680,723 B2 | 3/2010 | Friesen et al. |
| 7,684,144 B1 | 3/2010 | Goker et al. |
| 7,685,048 B1 | 3/2010 | Hausman et al. |
| 7,689,495 B1 | 3/2010 | Kim et al. |
| 7,702,615 B1 | 4/2010 | Delurgio et al. |
| 7,725,358 B1 | 5/2010 | Brown et al. |
| 7,725,383 B2 | 5/2010 | Wilton et al. |
| 7,742,934 B2 | 6/2010 | Offutt, Jr. et al. |
| 7,752,122 B2 | 7/2010 | Friesen et al. |
| 7,765,140 B1 | 7/2010 | Megiddo |
| 7,769,612 B1 | 8/2010 | Walker et al. |
| 7,835,970 B1 | 11/2010 | Marchegiani |
| 7,840,476 B1 | 11/2010 | Zack et al. |
| 7,958,013 B2 | 6/2011 | Porat et al. |
| 7,970,713 B1 | 6/2011 | Gorelik et al. |
| 7,979,347 B1 | 7/2011 | Greener et al. |
| 8,005,684 B1 | 8/2011 | Cheng et al. |
| 8,150,735 B2 | 4/2012 | Walker et al. |
| 8,229,831 B2 | 7/2012 | Fraser et al. |
| 8,326,697 B2 | 12/2012 | Kopelman et al. |
| 8,407,116 B1 | 3/2013 | Serkin et al. |
| 8,554,659 B2 | 10/2013 | Annunziata |
| 8,688,564 B2 | 4/2014 | Friesen et al. |
| 8,768,824 B2 | 7/2014 | Friesen et al. |
| 2001/0032116 A1 | 10/2001 | Hyatt |
| 2001/0032163 A1 | 10/2001 | Fertik et al. |
| 2001/0032171 A1* | 10/2001 | Brink .................... G06Q 40/04 |
| | | 705/37 |
| 2002/0007324 A1 | 1/2002 | Centner et al. |
| 2002/0010663 A1 | 1/2002 | Muller |
| 2002/0019794 A1 | 2/2002 | Katz et al. |
| 2002/0026403 A1 | 2/2002 | Tambay et al. |
| 2002/0026630 A1 | 2/2002 | Schmidt et al. |
| 2002/0069134 A1 | 6/2002 | Solomon |
| 2002/0111873 A1 | 8/2002 | Ehrlich et al. |
| 2002/0152135 A1 | 10/2002 | Beeri et al. |
| 2002/0156685 A1 | 10/2002 | Ehrlich et al. |
| 2003/0065586 A1 | 4/2003 | Shaftel et al. |
| 2003/0093343 A1 | 5/2003 | Huttenlocher et al. |
| 2003/0097328 A1 | 5/2003 | Lundberg et al. |
| 2003/0233305 A1 | 12/2003 | Solomon |
| 2004/0015415 A1* | 1/2004 | Cofino ................ G06Q 10/063 |
| | | 705/7.11 |
| 2005/0010494 A1 | 1/2005 | Mourad et al. |
| 2005/0021366 A1* | 1/2005 | Pool .................... G06F 17/2827 |
| | | 705/26.1 |
| 2006/0015413 A1* | 1/2006 | Giovannoli ............ G06Q 30/06 |
| | | 705/26.1 |
| 2006/0253334 A1 | 11/2006 | Fukasawa |
| 2007/0250431 A1 | 10/2007 | Olof-Ors |
| 2008/0071638 A1 | 3/2008 | Wanker |
| 2008/0077542 A1 | 3/2008 | McElhiney et al. |
| 2008/0270221 A1 | 10/2008 | Clemens et al. |
| 2009/0083120 A1 | 3/2009 | Strichman et al. |
| 2009/0138411 A1 | 5/2009 | O'Callahan |
| 2010/0023379 A1 | 1/2010 | Rappaport et al. |
| 2010/0082419 A1 | 4/2010 | Au-Yeung et al. |
| 2010/0185554 A1 | 7/2010 | Sivasundaram et al. |

FOREIGN PATENT DOCUMENTS

| | | |
|---|---|---|
| WO | 96/08783 A1 | 3/1996 |
| WO | 97/31322 A1 | 8/1997 |
| WO | 00/16232 A1 | 3/2000 |
| WO | 01/63521 A2 | 8/2001 |

OTHER PUBLICATIONS

Burke, "The Effects of Missing Information on Decision Strategy Selection," *Advances in Consumer Research* 17:250-256, 1990.

Lovelock et al., "Developing Global Strategies for Service Businesses," *California Management Review* 38(2):64-86, 1996.

Mantel et al., "The Role of Direction of Comparison, Attribute-Based Processing, and Attitude-Based Processing in Consumer Preference," *Journal of Consumer Research* 25:335-352, Mar. 1999.

O'Brien, "A Day at the Park Costs More Than Ever," *Amusement Business* 108(25):3-5, Jun. 1996.

(56) References Cited

OTHER PUBLICATIONS

Plotkin, "Business Rules Everywhere, Part 2," *Intelligent Enterprise* 2(10):42-48, Jul. 1999.
Plott et al., "Instability of Equilibria in Experimental Markets: Upward-Sloping Demands, Externalities, and Fad-Like Incentives," *Southern Economic Journal* 65(3):405-426, 1999.

* cited by examiner

SYSTEM AND METHOD FOR ADAPTING MARKET DATA AND EVALUATING UNEQUAL OFFERS

BACKGROUND

Technical Field

This present disclosure generally relates to electronic commerce software applications and, more particularly, to evaluating prices and transactions for purchasing.

Description of the Related Art

Commodity items such as lumber, agricultural products, metals, and livestock/meat are usually traded in the open market between a number of buyers and sellers. The sales transactions of most commodity items involve a number of parameters. For instance, in the trade of commodity lumber, a buyer usually orders materials by specifying parameters such as lumber species, grade, size (i.e., 2×4, 2×10, etc.), and length, as well as the "tally" or mix of units of various lengths within the shipment, method of transportation (i.e., rail or truck), shipping terms (i.e., FOB or delivered), and desired date of receipt, with each parameter influencing the value of the commodity purchase. Given the multiple possible combinations of factors, a commodity buyer often finds it difficult to objectively compare similar but unequal offerings among competing vendors.

For example, in a case where a lumber buyer desires to order a railcar load of spruce (SPF) 2×4's of #2 & Better grade, the buyer would query vendors offering matching species and grade carloads seeking the best match for the buyer's need or tally preference at the lowest market price. Lumber carloads are quoted at a price per thousand board feet for all material on the railcar. When the quoted parameters are not identical, it is very difficult for buyers to determine the comparative value of unequal offerings.

Typically, a lumber buyer will find multiple vendors each having different offerings available. For example, a railcar of SPF 2×4's may be quoted at a rate of $300/MBF (thousand board feet) by multiple vendors. Even though the MBF price is equal, one vendor's carload may represent significantly greater marketplace value because it contains the more desirable lengths of 2×4's, such as market-preferred 16-foot 2×4's. When the offering price varies in addition to the mix of lengths, it becomes increasingly difficult to compare quotes from various vendors. Further, because construction projects often require long lead times, the lumber product may need to be priced now, but not delivered until a time in the future. Alternately, another species of lumber (i.e., southern pine) may represent an acceptable substitute.

Therefore, from the foregoing, there is a need for a method and system that allows buyers to evaluate the price of commodity offerings possessing varying shipping parameters.

BRIEF SUMMARY

The present disclosure describes a system that operates in a networked environment. The system comprises at least one server that includes a network interface, a non-transitory computer-readable medium, and a processor in communication with the network interface and the computer-readable medium. The computer-readable medium has computer-executable instructions stored thereon that, when executed, implement components including at least a metric server adapter and a metrics application. The processor is configured to execute the computer-executable instructions stored in the computer-readable medium.

In various embodiments, the metric server adapter includes governing logic programmed to manage at least one evaluation service and a plurality of predefined instructions that pertain to the evaluation service and/or data used to provide the at least one evaluation service. The metrics application includes one or more production applications or modules programmed to manage one or more purchase and/or analysis processes, to execute the evaluation service in coordination with the metric server adapter. The metrics application also manages one or more user interfaces that, in operation, facilitate interactions with the server.

In operation, the server is configured to receive a plurality of price data sets from at least one computing device in communication with the server, or retrieve a plurality of price data sets from at least one data source accessible to the server. Each price data set comprises an offer to buy or sell that identifies price data for at least one item possessing a plurality of attributes that include two or more parameter values or a plurality of items having attributes that differ by at least one parameter value. At least one price data set represents an unequal offer in that the price data set identifies at least one item that differs by at least one parameter value from the item as identified in another price data set.

In response to receipt or retrieval of at least one price data set, the server implements the evaluation service which causes the metrics application, for each price data set, to obtain time-dependent metric data from at least one data source accessible to the server. The obtained metric data includes market reference price data for one or more responsive items possessing attributes that are responsive to attributes of a respective item identified in the price data set. Each responsive item in the metric data possesses a plurality of attributes that include at least one parameter value.

The metrics application evaluates the plurality of attributes of each responsive item in the metric data relative to the attributes for the respective item identified in the price data set to dynamically discover relationships within the attributes. Discovery of a relationship comprising a difference is disclosed to the metric server adapter which enables the metric server adapter to define offer-specific instructions for adapting the metric data for the respective item.

The metrics application normalizes the metric data by executing the offer-specific instructions for adapting the metric data for the respective item. Execution of at least one offer-specific instruction causes one or more adjustment values to be generated and applied to the market reference price data for at least one responsive item that differs by at least one parameter value from the respective item as identified in the price data set, transforming the market reference price data for the at least one responsive item and automatically producing one or more offer-specific market reference price data values for the respective item.

The metrics application generates at least one comparative metric that pertains to the at least one evaluation service. The comparative metric is based, at least in part, on one or a combination of the offer-specific market reference price data values produced for the respective item or items identified in a price data set. The comparative metric comprises a differential ratio or index value that compares the price data identified for the item or items in the offer with the offer-specific market reference price data values produced for the item or items.

Also disclosed herein, in various embodiments, is a method for evaluating unequal offers in a networked environment. The method includes receiving, at at least one server, a plurality of price data sets. The server operates under control of computer-executable instructions that, when executed by a processor, implement components including at least a governing logic component and a production component. Each price data set comprises an offer to buy or sell that identifies price data for at least one item possessing attributes that include two or more parameter values or a plurality of items having attributes that differ by at least one parameter value. At least one price data set represents an unequal offer in that the price data set identifies at least one item that differs by at least one parameter value from the item as identified in another price data set.

For each received price data set, the method further comprises implementing, by the server, at least one evaluation service. In operation, the evaluation service includes obtaining, by the production component, time-dependent market-reference data from at least one data source accessible to the server. The market reference data includes market-reference price data for one or more responsive items possessing attributes that are responsive to attributes of a respective item identified in the price data set, wherein each responsive item possesses a plurality of attributes including at least one parameter value.

The evaluation service further includes evaluating, by the production component, the plurality of attributes of each responsive item in the market reference data relative to the plurality of attributes for the respective item as identified in the price data set to dynamically discover relationships within the attributes. Discovery of a relationship comprising a difference is disclosed to the governing logic component which enables the governing logic component to define offer-specific instructions for adapting the market reference data for the respective item.

The market reference data is normalized, wherein the production component executes the offer-specific instructions for adapting the market reference data for the respective item. Execution of at least one offer-specific instruction causes one or more adjustment values to be generated and applied to the market reference price data for at least one responsive item that differs by at least one parameter value from the respective item as identified in the price data set, transforming the market reference price data for the at least one responsive item and automatically producing one or more offer-specific market reference price data values for the respective item.

At least one comparative metric that pertains to the evaluation service is generated by the production component. The comparative metric is based, at least in part, on one or a combination of the offer-specific market reference price data values produced for the respective item or items identified in the price data set. The comparative metric comprises a differential ratio or index value that compares the price data identified for the item or items in the offer with the offer-specific market reference price data values produced for the item or items.

Further disclosed herein is a non-transitory computer-readable medium having computer-executable instructions stored thereon. The computer-executable instructions, when executed, cause at least one server in a networked environment to perform operations that include receiving, at the server, a plurality of price data sets. The server operates under control of the computer-executable instructions that, when executed by a processor, implement components including a governing logic component and a production component.

Each price data set includes price data and represents an offer to buy or sell at least one identified item possessing attributes that include two or more parameter values or a plurality of items having attributes that differ by at least one parameter value. At least one price data set represents an unequal offer in that the price data set identifies at least one item that differs by at least one parameter value from the item as identified in another price data set.

Implementing at least one evaluation service, for each received price data set, the computer-executable instructions cause the server to obtain, by the production component, time-dependent market-reference data from at least one data source accessible to the server. The market reference data includes market-reference price data for one or more responsive items possessing attributes that are responsive to attributes of a respective item identified in the price data set. Each responsive item in the market-reference data possesses a plurality of attributes including at least one parameter value.

The production component evaluates the plurality of attributes of each responsive item in the market reference data relative to the plurality of attributes for the respective item as identified in the price data set to dynamically discover relationships within the attributes. Discovery of a relationship comprising a difference is disclosed to the governing logic component which enables the governing logic component to define offer-specific instructions for adapting the market reference data for the respective item.

The production component normalizes the market reference data, wherein the production component executes the offer-specific instructions for adapting the market reference data for the respective item. Execution of at least one offer-specific instruction causes one or more adjustment values to be generated and applied to the market reference price data for at least one responsive item that differs by at least one parameter value from the respective item as identified in the price data set, transforming the market reference price data for the at least one responsive item and automatically producing one or more offer-specific market reference price data values for the respective item.

The production component generates at least one comparative metric that pertains to the at least one evaluation service. The comparative metric is based, at least in part, on one or a combination of the offer-specific market reference price data values produced for the respective item or items identified in the price data set. The comparative metric comprises a differential ratio or index value that compares the price data identified for the item or items in the offer with the offer-specific market reference price data values produced for the item or items.

BRIEF DESCRIPTION OF THE SEVERAL
VIEWS OF THE DRAWINGS

The foregoing aspects and many of the attendant advantages of the present disclosure will become more readily appreciated as the same become better understood by reference to the following detailed description, when taken in conjunction with the accompanying drawings, wherein:

FIGS. 8A-8D are images of windows produced by a Web browser application installed on a client computer accessing a server illustrating one embodiment of the present disclosure.

DETAILED DESCRIPTION

Figure 1:
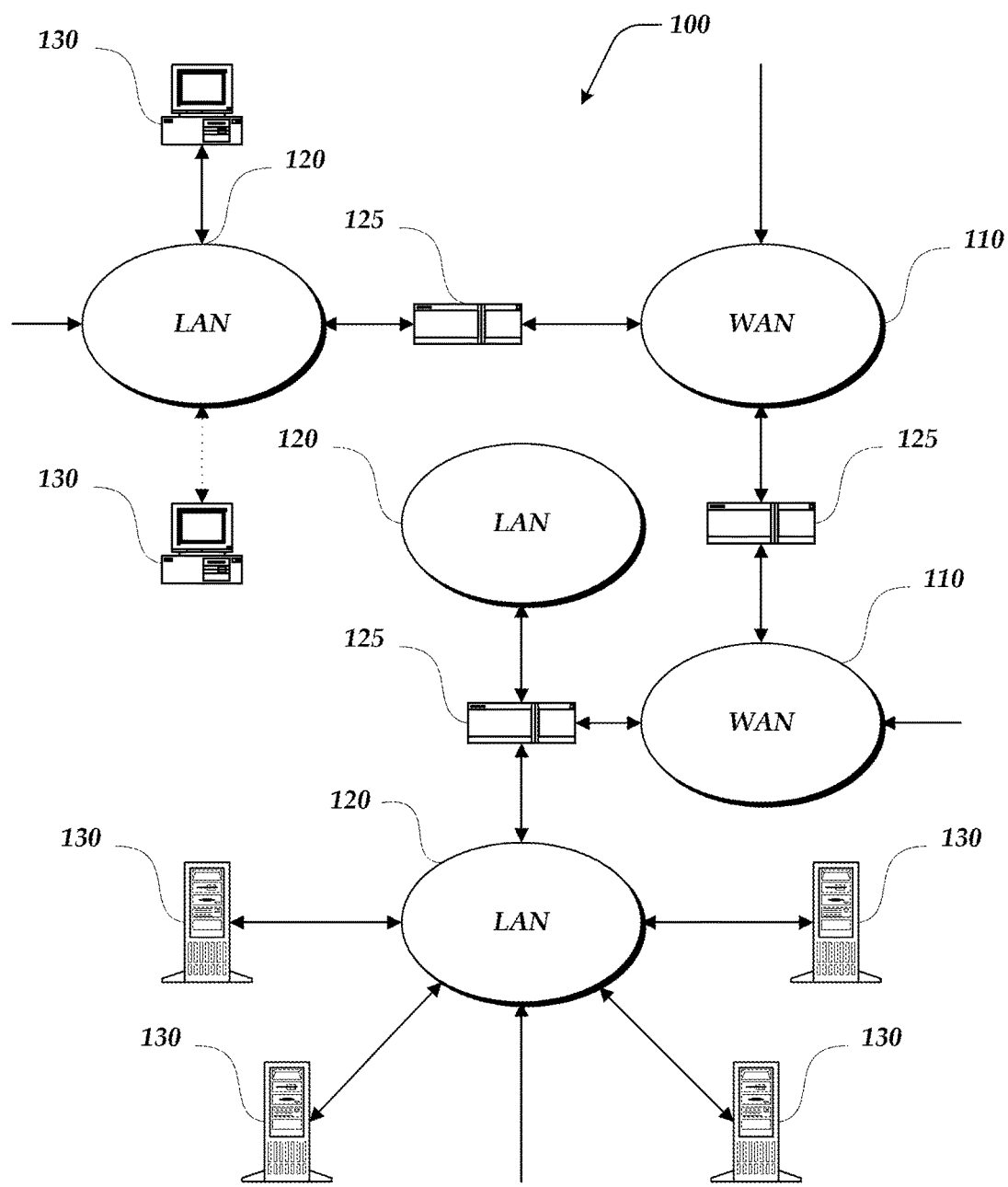
FIG. 1 is a block diagram of a prior art representative portion of the Internet.

The term "Internet" refers to the collection of networks and routers that use the Internet Protocol (IP) to communicate with one another. A representative section of the Internet 100 as known in the prior art is shown in FIG. 1 in which a plurality of local area networks (LANs) 120 and a wide area network (WAN) 110 are interconnected by routers 125. The routers 125 are generally special-purpose computers used to interface one LAN or WAN to another. Communication links within the LANs may be twisted wire pair, or coaxial cable, while communication links between networks may utilize 56 Kbps analog telephone lines, or 1 Mbps digital T-1 lines, and/or 45 Mbps T-3 lines. Further, computers and other related electronic devices can be remotely connected to either the LANs 120 or the WAN 110 via a modem and temporary telephone link. Such computers and electronic devices 130 are shown in FIG. 1 as connected to one of the LANs 120 via dotted lines. It will be appreciated that the Internet comprises a vast number of such interconnected networks, computers, and routers and that only a small representative section of the Internet 100 is shown in FIG. 1.

Figure 2:
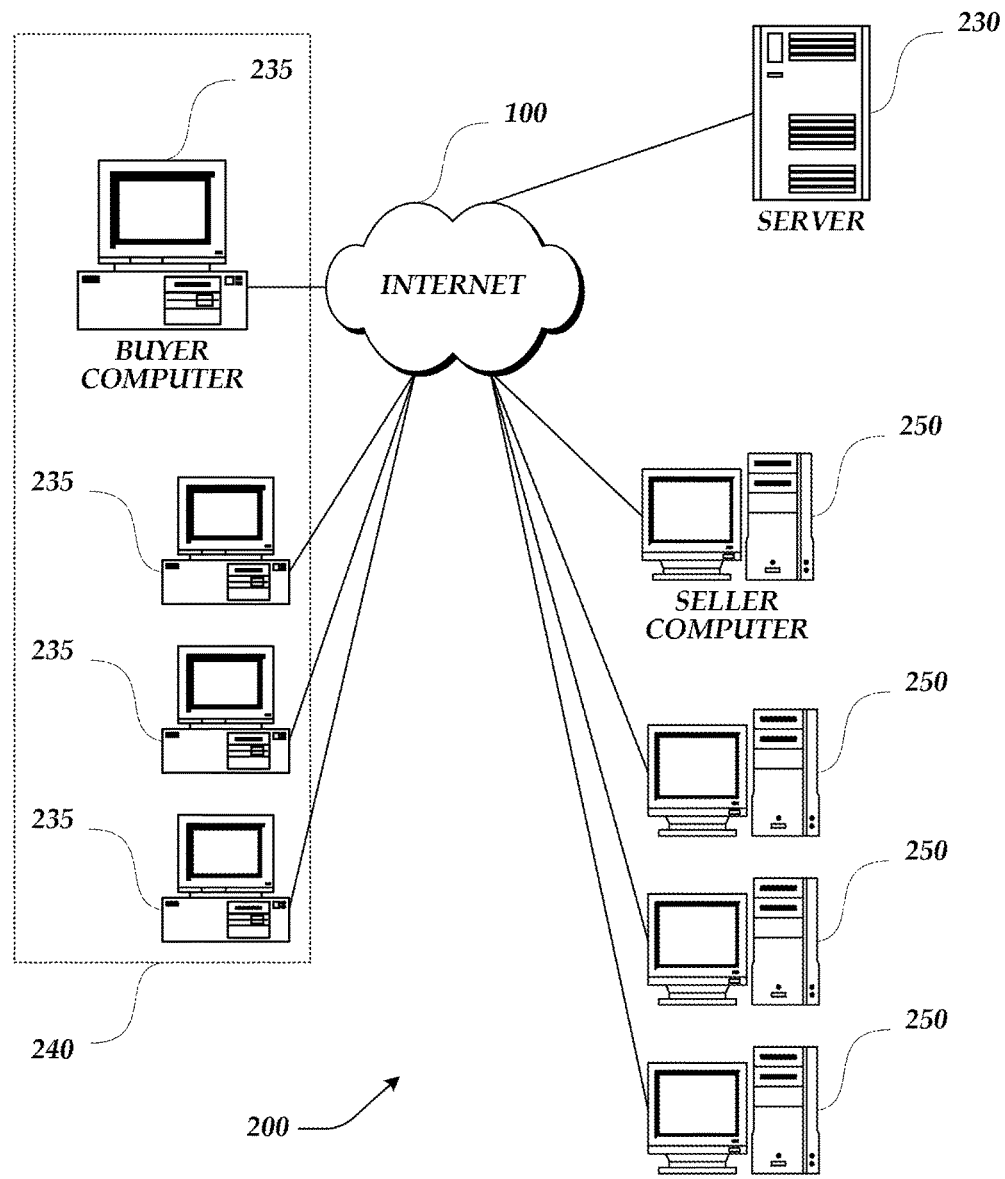
FIG. 2 is a pictorial diagram of a system of devices connected to the Internet, which depict the travel route of data.

The World Wide Web (WWW), on the other hand, is a vast collection of interconnected, electronically stored information located on servers connected throughout the Internet 100. Many companies are now providing services and access to their content over the Internet 100 using the WWW. In accordance with the present disclosure, and as shown in FIG. 2, there may be a plurality of buyers operating a plurality of client computing devices 235. FIG. 2 generally shows a system 200 of computers and devices to which an information server 230 is connected and to which the buyers' computers 235 are also connected. Also connected to the Internet 100 is a plurality of computing devices 250 associated with a plurality of sellers. The system 200 also includes a communications program, referred to as CEA, which is used on the sellers' computing devices 250 to create a communication means between the sellers' backend office software and the server applications.

The buyers of a market commodity may, through their computers 235, request information about a plurality of items or order over the Internet 100 via a Web browser installed on the buyers' computers. Responsive to such requests, the information server 230, also referred to as a server 230, may combine the first buyer's information with information from other buyers on other computing devices 235. The server 230 then transmits the combined buyer data to the respective computing devices 250 associated with the plurality of sellers. Details of this process are described in more detail below in association with FIGS. 5-7.

Those of ordinary skill in the art will appreciate that in other embodiments of the present disclosure, the capabilities of the server 230 and/or the client computing devices 235 and 250 may all be embodied in the other configurations. Consequently, it would be appreciated that in these embodiments, the server 230 could be located on any computing device associated with the buyers' or sellers' computing devices. Additionally, those of ordinary skill in the art will recognize that while only four buyer computing devices 235, four seller computing devices 250, and one server 230 are depicted in FIG. 2, numerous configurations involving a vast number of buyer and seller computing devices and a plurality of servers 230, equipped with the hardware and software components described below, may be connected to the Internet 100.

Figure 3:
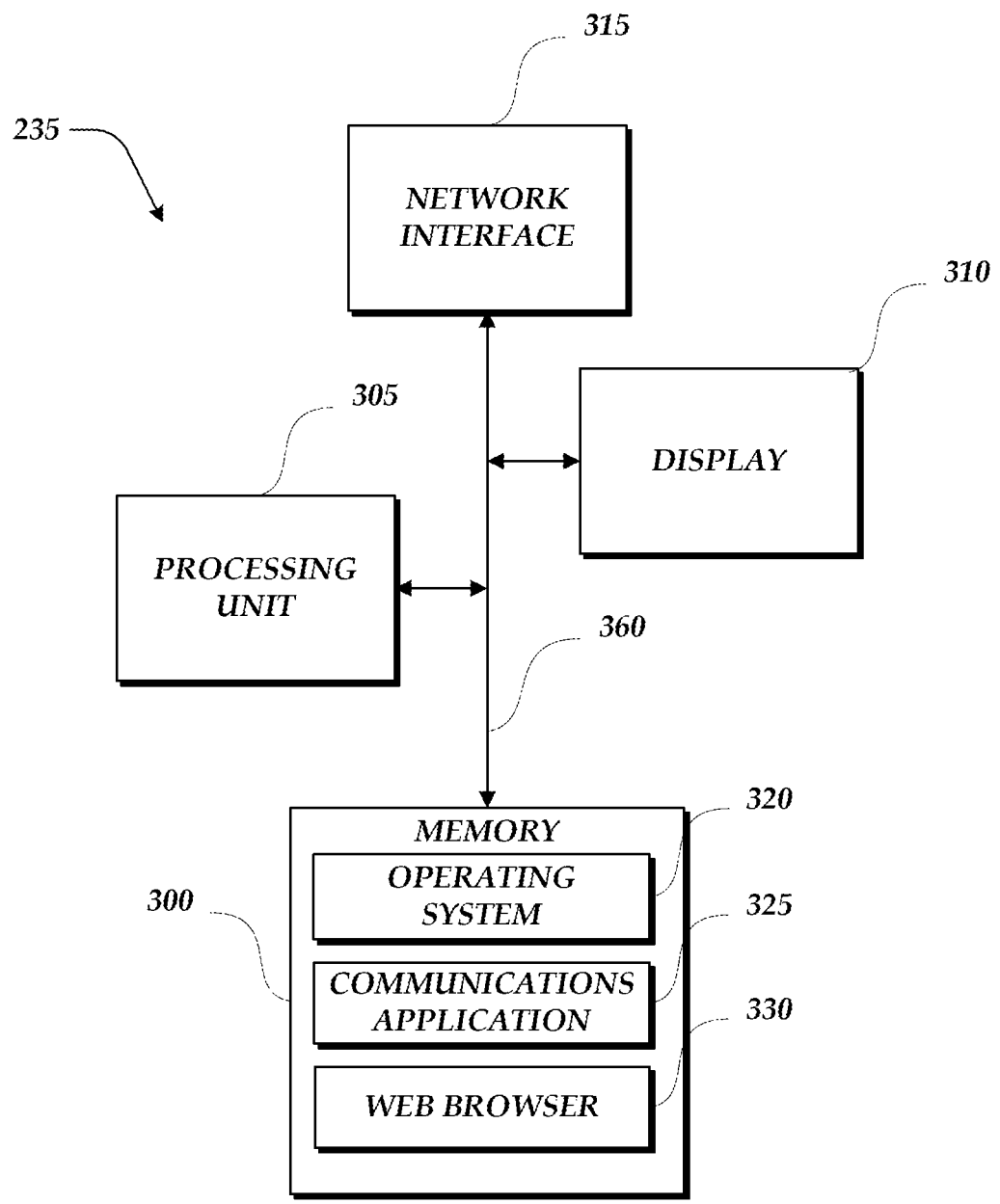
FIG. 3 is a block diagram of the several components of the buyer's computer shown in FIG. 2 that is used to request information on a particular route.

FIG. 3 depicts several of the key components of the buyer's client computing device 235. As known in the art, client computing devices 235 are also referred to as "clients" or "devices," and client computing devices 235 also include other devices such as palm computing devices, cellular telephones, or other like forms of electronics. A client computing device can also be the same computing device as the server 230. An "agent" can be a person, server, or a client computing device 235 having software configured to assist the buyer in making purchasing decisions based on one or more buyer-determined parameters. Those of ordinary skill in the art will appreciate that the buyer's computer 235 in actual practice will include many more components than those shown in FIG. 3. However, it is not necessary that all of these generally conventional components be shown in order to disclose an illustrative embodiment for practicing the present invention. As shown in FIG. 3, the buyer's computer includes a network interface 315 for connecting to the Internet 100. Those of ordinary skill in the art will appreciate that the network interface 315 includes the necessary circuitry for such a connection and is also constructed for use with TCP/IP protocol.

The buyer's computer 235 also includes a processing unit 305, a display 310, and a memory 300, all interconnected along with the network interface 315 via a bus 360. The memory 300 generally comprises a random access memory (RAM), a read-only memory (ROM), and a permanent mass storage device, such as a disk drive. The memory 300 stores the program code necessary for requesting and/or depicting a desired route over the Internet 100 in accordance with the present disclosure. More specifically, the memory 300 stores a Web browser 330, such as Netscape's NAVIGATOR® or Microsoft's INTERNET EXPLORER® browsers, used in accordance with the present disclosure for depicting a desired route over the Internet 100. In addition, memory 300 also stores an operating system 320 and a communications application 325. It will be appreciated that these software components may be stored on a computer-readable medium and loaded into memory 300 of the buyers' computer 235 using a drive mechanism associated with the computer-readable medium, such as a floppy, tape, or CD-ROM drive.

Figure 4:
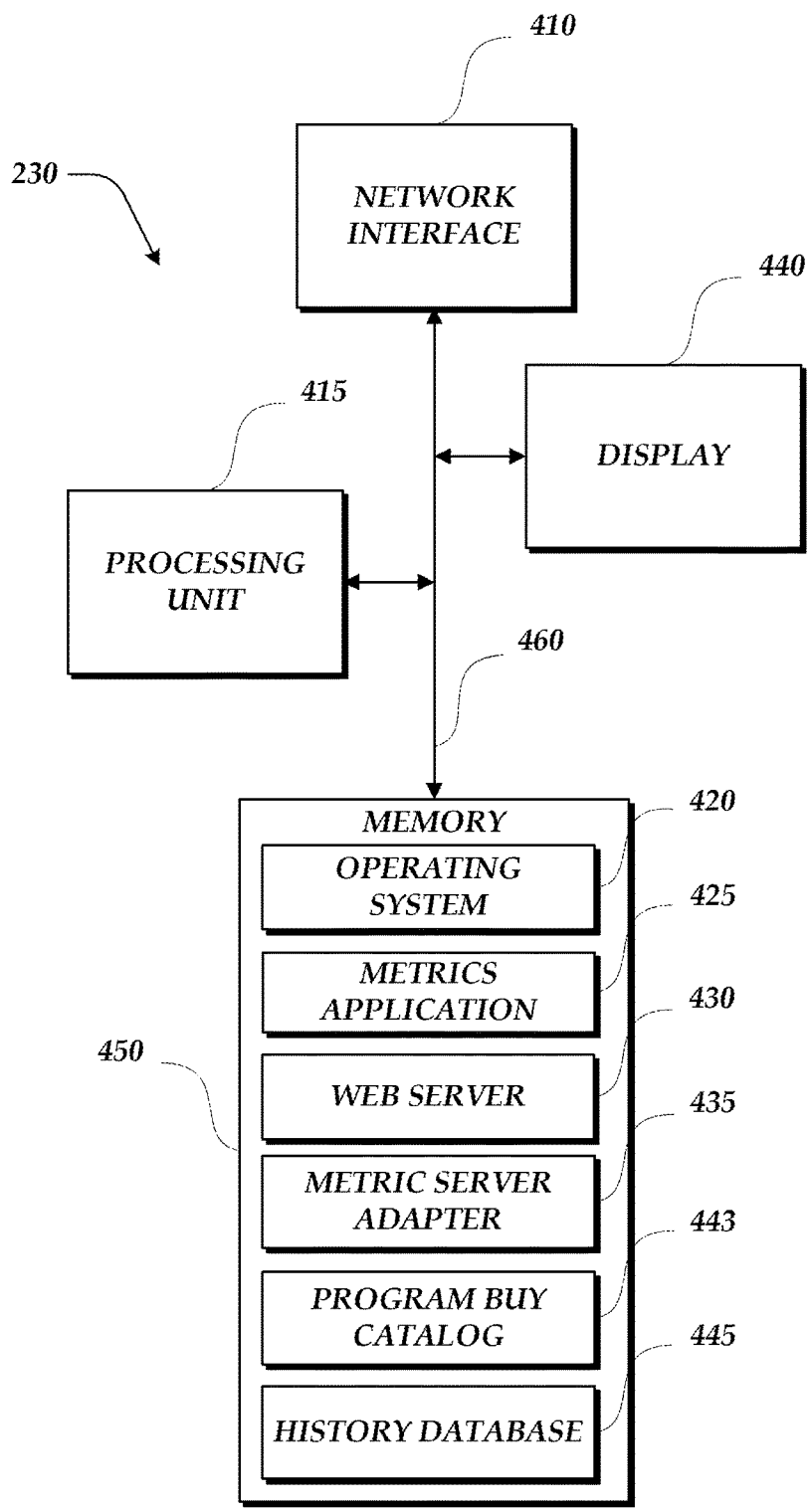
FIG. 4 is a block diagram of the several components of an information server shown in FIG. 2 that is used to supply information on a particular route.

As will be described in more detail below, the user interface which allows products to be ordered by the buyers are supplied by a remote server, i.e., the information server 230 located elsewhere on the Internet, as illustrated in FIG. 2. FIG. 4 depicts several of the key components of the information server 230. Those of ordinary skill in the art will appreciate that the information server 230 includes many more components than shown in FIG. 4. However, it is not necessary that all of these generally conventional components be shown in order to disclose an illustrative embodiment for practicing the present invention. As shown in FIG. 4, the information server 230 is connected to the Internet 100 via a network interface 410. Those of ordinary skill in the art will appreciate that the network interface 410 includes the necessary circuitry for connecting the information server 230 to the Internet 100, and is constructed for use with TCP/IP protocol.

The information server 230 also includes a processing unit 415, a display 440, and a mass memory 450, all interconnected along with the network interface 410 via a bus 460. The mass memory 450 generally comprises a random access memory (RAM), read-only memory (ROM), and a permanent mass storage device, such as a hard disk drive, tape drive, optical drive, floppy disk drive, or combination thereof. The mass memory 450 stores the program code and data necessary for incident and route analysis as well as supplying the results of that analysis to consumers in accordance with the present disclosure. More specifically, the mass memory 450 stores a metrics application 425 formed in accordance with the present disclosure for managing the purchase forums of commodities products, and a metric server adapter 435 for managing metric data and the logic for adapting the metric data. In addition, the mass memory 450 stores a database 445 of buyer information continuously logged by the information server 230 for statistical market analysis. It will be appreciated by those of ordinary skill in the art that the database 445 of product and buyer information may also be stored on other servers or storage devices connected to either the information server 230 or the Internet 100. Finally, the mass memory 450 stores Web server software 430 for handling requests for stored information received via the Internet 100 and the WWW, and an operating system 420. It will be appreciated that the aforementioned software components may be stored on a computer-readable medium and loaded into the mass memory 450 of the information server 230 using a drive mechanism associated with the computer-readable medium, such as floppy, tape, or CD-ROM drive. In addition, the data stored in the mass memory 450 and other memory can be "exposed" to other computers or persons for purposes of communicating data. Thus, "exposing" data from a computing device could mean transmitting data to another device or person, transferring XML data packets, transferring data within the same computer, or other like forms of data communications.

Figure 5:
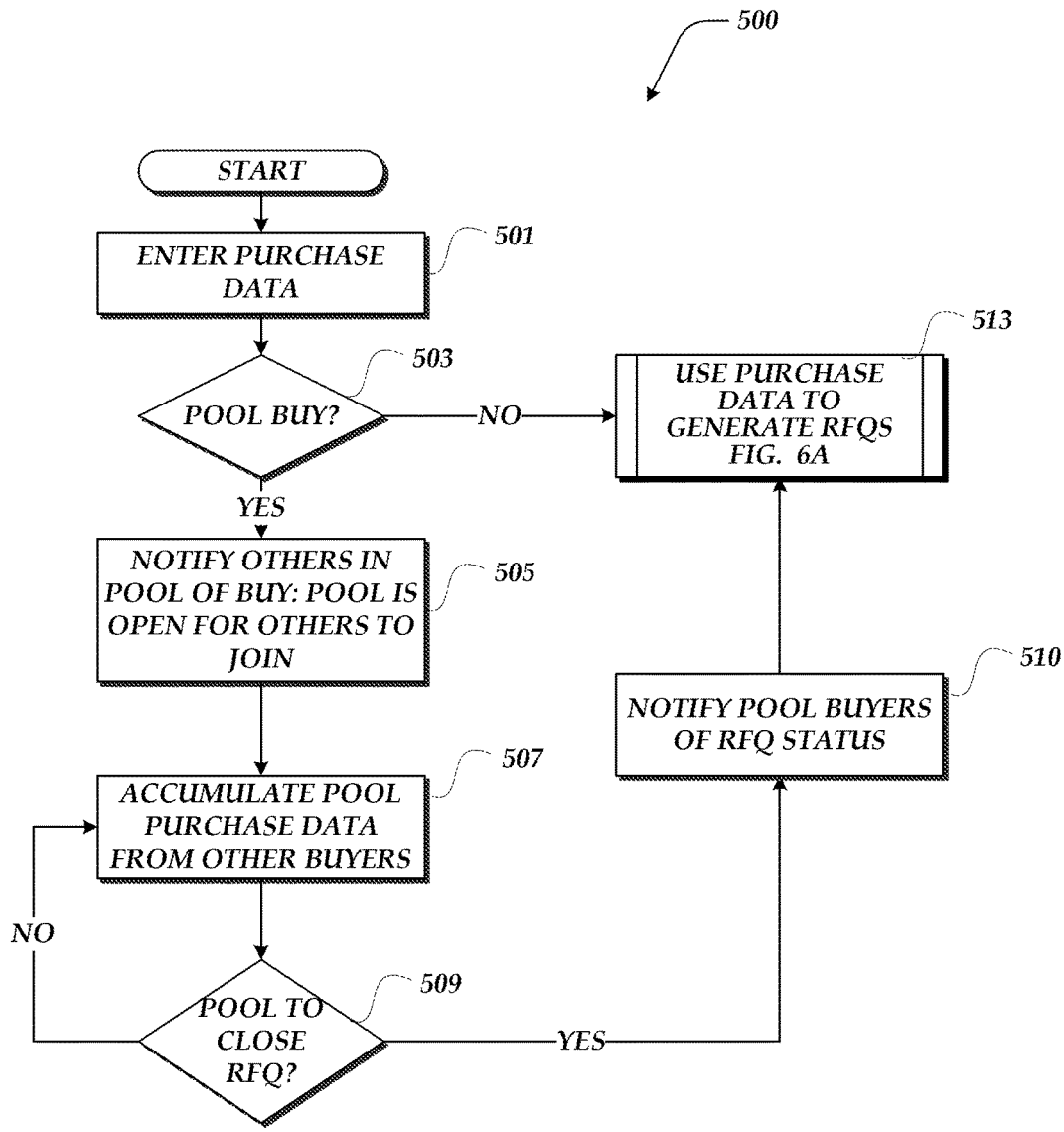
FIG. 5 is a flow diagram illustrating the logic of a routine used by the information server to receive and process the buyer's actions.

In accordance with one embodiment of the present disclosure, FIG. 5 is a flow chart illustrating the logic implemented for the creation of a Request for Quote (RFQ) by a singular buyer or a pool of buyers. In process of FIG. 5, also referred to as the pooling process 500, a buyer or a pool of buyers generate an RFQ which is displayed or transmitted to a plurality of sellers. Responsive to receiving the RFQ, the sellers then send quotes to the buyers.

In summary, the creation of the RFQ consists of at least one buyer initially entering general user identification information to initiate the process. The buyer would then define a Line Item on a Web page displaying an RFQ form. The Line Item is defined per industry specification and units of product are grouped as a "tally" per industry practice. The pooling process 500 allows buyers to combine RFQ Line Items with other buyers with like needs. In one embodiment, the pool buy feature is created by a graphical user interface where the RFQ Line Items from a plurality of buyers are displayed on a Web page to one of the pool buyers, referred to as the pool administrator. The server 230 also provides a Web-based feature allowing the pool administrator to selectively add each RFQ Line Item to one combined RFQ. The combined RFQ is then sent to at least one vendor or seller. This feature provides a forum for pooling the orders of many buyers, which allows individual entities or divisions of larger companies to advantageously bid for larger orders, thus providing them with more bidding power and the possibility of gaining a lower price.

Figure 8A:
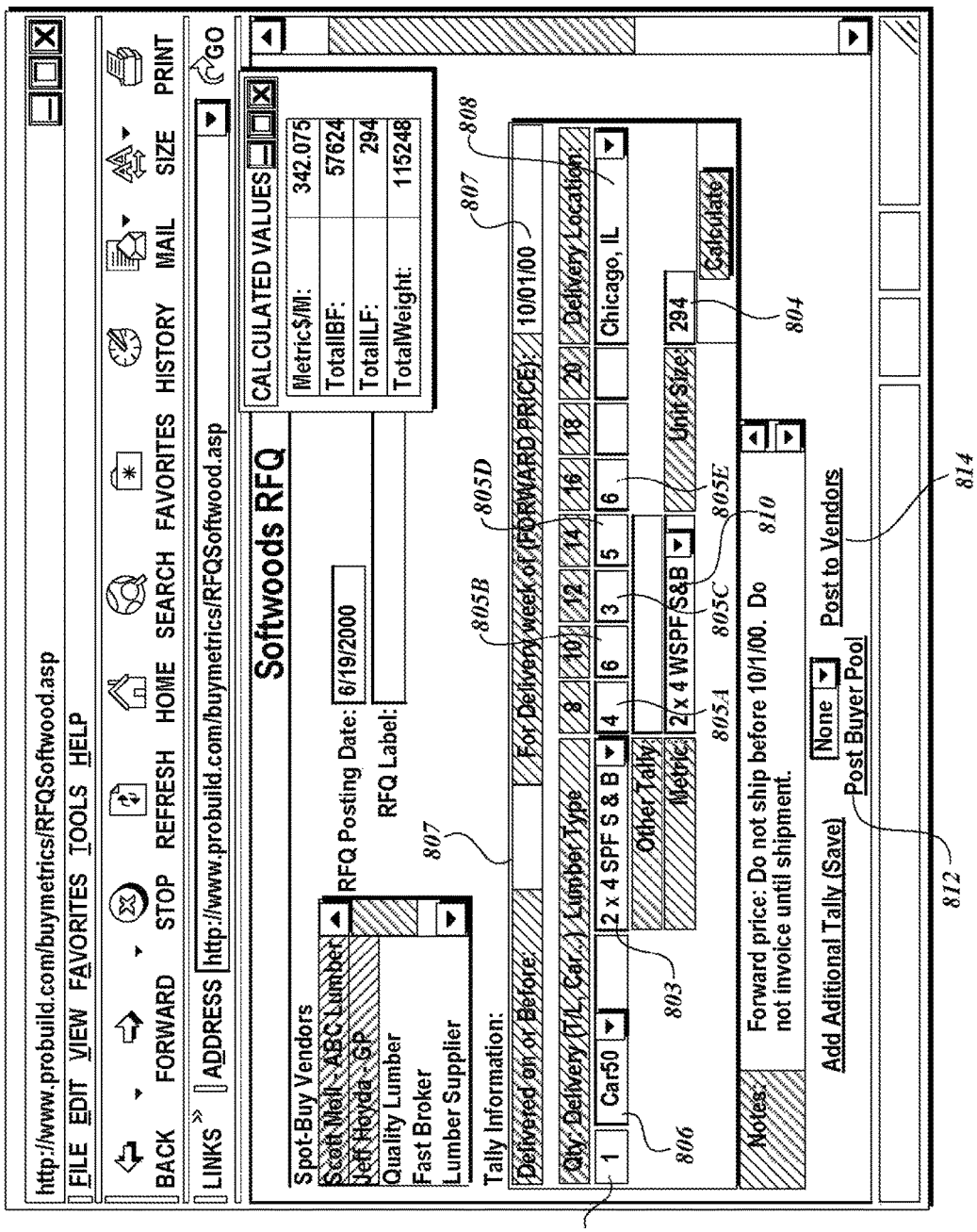

The pooling process 500 begins in step 501 where a buyer initiates the process by providing buyer purchase data. In step 501, the buyer accesses a Web page transmitted from the server 230 configured to receive the buyer purchase data, also referred to as the product specification data set or the Line Item data. One exemplary Web page for the logic of step 501 is depicted in FIG. 8A. As shown in FIG. 8A, the buyer enters the Line Item data specifications in the fields of the Web page. The Line Item data consists of lumber species and grade 803, number of pieces per unit 804, quantities of the various units comprising the preferred assortment in the tally 805A-E, delivery method 806, delivery date 807, delivery location 808, and the overall quantity 809. In one embodiment, the buyer must define the delivery date as either contemporaneous "on-or-before" delivery date or specify a delivery date in the future for a "Forward Price" RFQ. In addition, the buyer selects a metric or multiple metrics in a field 810 per RFQ Line Item (tally). As described in more detail below, the metric provides pricing data that is used as a reference point for the buyer to compare the various quotes returned from the sellers. The buyer RFQ Line Item data is then stored in the memory of the server 230.

Returning to FIG. 5, at a next step 503, the server 230 determines if the buyer is going to participate in a pool buy. In the process of decision block 503, the server 230 provides an option in a Web page that allows the buyer to post their Line Item data to a vendor or post their Line Item data to a buyer pool. The window illustrated in FIG. 8A is one exemplary Web page illustrating these options for a buyer. As shown in FIG. 8A, the links "Post Buyer Pool" 812 and "Post to Vendors" 814 are provided on the RFQ Web page.

At step 503, if the buyer does not elect to participate in a pool buy, the process continues to step 513 where the server 230 generates a request for a quote (RFQ) from the buyer's Line Item data. A detailed description of how the server 230 generates a request for a quote (RFQ) is summarized below and referred to as the purchase order process 600A depicted in FIG. 6A.

Alternatively, at decision block 503, if the buyer elects to participate in a pool buy, the process continues to step 505 where the system notifies other buyers logged into the server 230 that an RFQ is available in a pool, allowing other buyers to add additional Line Items (tallies) to the RFQ. In this part of the process, the Line Items from each buyer are received by and stored in the server memory. The Line Items provided by each buyer in the pool are received by the server 230 using the same process as described above with reference to block 501 and the Web page of FIG. 8A. All of the Line Items stored on the server 230 are then displayed to a pool administrator via a Web page or an e-mail message. In one embodiment, the pool administrator is one of the buyers in a pool where the pool administrator has the capability to select all of the Line Item data to generate a combined RFQ. The server 230 provides the pool administrator with this capability by the use of any Web-based communicative device, such as e-mail or HTML forms. As part of the process, as shown in steps 507 and 509, the pool may be left open for a predetermined period of time to allow additional buyers to add purchase data to the current RFQ.

At decision block 509, the server 230 determines if the pool administrator has closed the pool. The logic of this step 509 is executed when the server 230 receives the combined RFQ data from the pool administrator. The pool administrator can send the combined RFQ data to the server 230 via an HTML form or by other electronic messaging means such as e-mail or URL strings. Once the server 230 has determined that the pool is closed, the process continues to block 510 where the Line Items from each buyer (the combined RFQ) are sent to all of the buyers in the pool. The process then continues to step 513 where the server 230 sends the combined RFQ to the vendors or sellers.

Figure 6A:
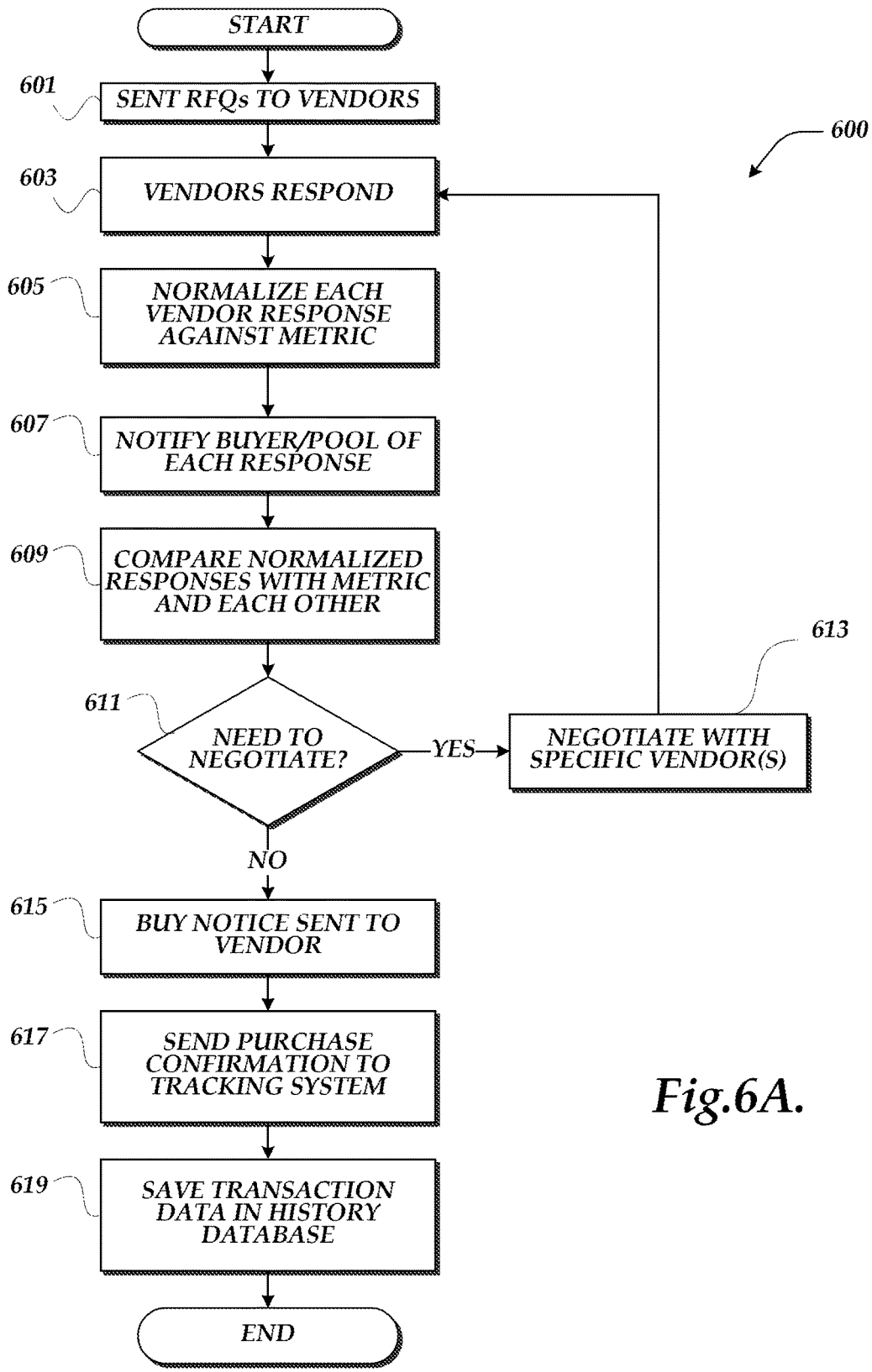
FIGS. 6A-6B are flow diagrams illustrating another embodiment of the logic used by the information server to receive and process the quotes and quote requests of both buyers and vendors.

Referring now to FIG. 6A, one embodiment of the purchase-negotiation process 600 is disclosed. The purchase-negotiation process 600 is also referred to as a solicited offer process or the market purchase process. In summary, the purchase-negotiation process 600 allows at least one buyer to submit an RFQ and then view quotes from a plurality of vendors and purchase items from selected vendor(s). The logic of FIG. 6A provides buyers with a forum that automatically manages, collects, and normalizes the price of desired commodity items. The purchase-negotiation process 600 calculates a normalized price data set that is based on a predefined metric(s). The calculation of the normalized price data set in combination with the format of the Web pages described herein create an integrated forum where quotes for a plurality of inherently dissimilar products can be easily obtained and compared.

The purchase-negotiation process 600 begins at step 601 where the RFQ, as generated by one buyer or a pool of buyers in the process depicted in FIG. 5, is sent to a plurality of computing devices 250 associated with a plurality of sellers or vendors. The vendors receive the RFQ via a Web page transmitted by the server 230. In one embodiment, the vendors receive an e-mail message having a hypertext link to the RFQ Web page to provide notice to the vendor. Responsive to the information in the buyers' RFQ, the process then continues to step 603 where at least one vendor sends their quote information to the server 230.

In the process of step 603, the vendors respond to the RFQ by sending their price quote to the server 230 for display via a Web page to the buyer or buyer pool. Generally described, the vendors send an HTML form or an e-mail message with a price and description of the order. The description of the order in the quote message contains the same order information as the RFQ.

Figure 8B:
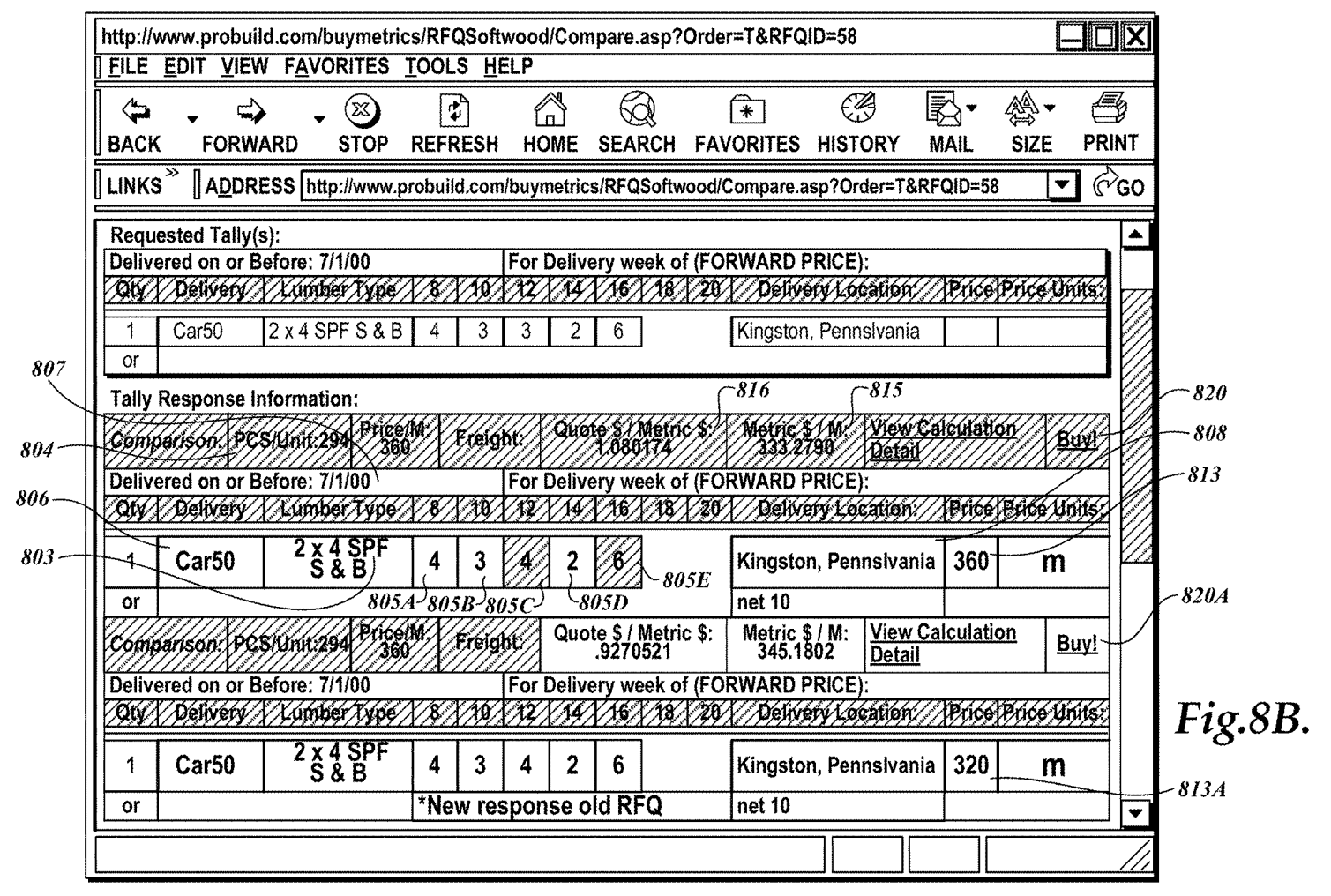

FIG. 8B illustrates one exemplary Web page of a vendor quote that is displayed to the buyer. As shown in FIG. 8B, the vendor quote includes the vendor's price 813, the lumber species and grade 803, number of pieces per unit 804, quantities of the various units comprising the preferred assortment in the tally 805A-E, delivery method 806, delivery date 807, and delivery location 808. In the quote response message, the vendor has the capability to modify any of the information that was submitted in the RFQ. For example, the vendor may edit the quantity values for the various units comprising the preferred assortment in the tally 805A-E. This allows the vendor to adjust the buyer's request according to the vendor's inventory, best means of transportation, etc. All of the vendor's quote information is referred to as price data set or the RFQ Line Item (tally) quote.

Returning to FIG. 6A, the process continues to step 605, where the server 230 normalizes the price of each RFQ Line Item (tally) quote from each vendor. The normalization of the vendor's price is a computation that evaluates the vendor's price utilizing data from a metric. The normalization process is carried out because each vendor may respond to the Line Items of an RFQ by quoting products that are different from a buyer's RFQ and/or have a different tally configuration. The normalization of the metric pricing allows the buyers to objectively compare the relative value of the different products offered by the plurality of vendors. For example, one vendor may produce a quote for an RFQ of one unit of 2×4×10, two units of 2×4×12, and three units of 2×4×16. At the same time, another vendor may submit a quote for three units of 2×4×10, one unit of 2×4×12, and two units of 2×4×16. Even though there is some difference between these two offerings, the price normalization process provides a means for the buyer to effectively compare and evaluate the different quotes even though there are variations in the products. The price normalization process 900 is described in more detail below in conjunction with the flow diagram of FIG. 9.

Returning again to FIG. 6A, at step 607 the vendor's quote information is communicated to the buyer's computer for display. As shown in FIG. 8B and described in detail above, the vendor's quote is displayed via a Web page that communicates the vendor's quote price 813 and other purchase information. In addition, the vendor's quote page contains a metric price 815 and a quote price versus metric price ratio 816. The metric price 815 and the quote price versus metric price ratio 816 are also referred to as a normalized price data value. A ratio higher than one (1) indicates a quote price that is above the metric price, and a lower ratio indicates a quote price that is below the metric price.

Next, at step 609, the buyer or the administrator of the buyer pool compares the various products and prices quoted by the vendors along with the normalized price for each Line Item on the RFQ. In this part of the process, the buyer may decide to purchase one of the products from a particular vendor and sends a notification to the selected vendor indicating the same. The buyer notifies the selected vendor by the use of an electronic means via the server 230, such as an HTML form, a chat window, e-mail, etc. For example, the quote Web page depicted in FIG. 8B shows two different quotes with two different tallies, the first quote price 813 of $360, and the second quote price 813A of $320. If the buyer determines that they prefer to purchase the materials listed in the first quote, the buyer selects the "Buy!" hyperlink 820 or 820A associated with the desired tally.

If the buyer is not satisfied with any of the listed vendor quotes, the server 230 allows the buyer to further negotiate with one or more of the vendors to obtain a new quote. This step is shown in decision block 611, where the buyer makes the determination to either accept a quoted price or proceed to step 613 where they negotiate with the vendor to obtain another quote or present a counter-offer. Here, the server 230 provides a graphical user interface configured to allow the buyer and one vendor to electronically communicate, using, e.g., a chat window, streaming voice communications, or other standard methods of communication. There are many forms of electronic communications known in the art that can be used to allow the buyer and vendors to communicate.

The buyer and seller negotiate various quotes and iterate through several steps 603-613 directed by the server 230, where each quote is normalized, compared, and further negotiated until a quote is accepted by the buyer or negotiations cease. While the buyer and seller negotiate the various quotes, the server 230 stores each quote until the two parties agree on a price. At any step during the negotiation process, the system always presents the buyer with an option to terminate the negotiation if dissatisfied with the quote(s).

At decision block 611, when a buyer agrees on a quoted price, the process then continues to step 615 where the buyer sends a notification message to the vendor indicating they have accepted a quote. As described above with reference to steps 603-613, the buyer notification message of step 615 may be in the form of a message on a chat window, e-mail, by an HTML form, or the like. However, the buyer notification must be transmitted in a format that allows the system to record the transaction. The buyer notification may include all of the information regarding the specifications by RFQ Line Item, such as, but not limited to, the buy price, date, and method of shipment, and payment terms.

The purchase-negotiation process 600 is then finalized when the system, as shown in step 617, sends a confirmation message to a tracking system. The confirmation message includes all of the information related to the agreed sales transaction.

Optionally, the process includes step 619, where the server 230 stores all of the information related to RFQ, offers, and the final sales transaction in a historical database. This would allow the server 230 to use all of the transaction information in an analysis process for providing an improved method of obtaining a lower market price in future transactions and in identifying optimum purchasing strategy. The analysis process is described in further detail below. Although the illustrated embodiment is configured to store the data related to the sales transactions, the system can also be configured to store all of the iterative quote information exchanged between the buyer and vendor.

Figure 6B:
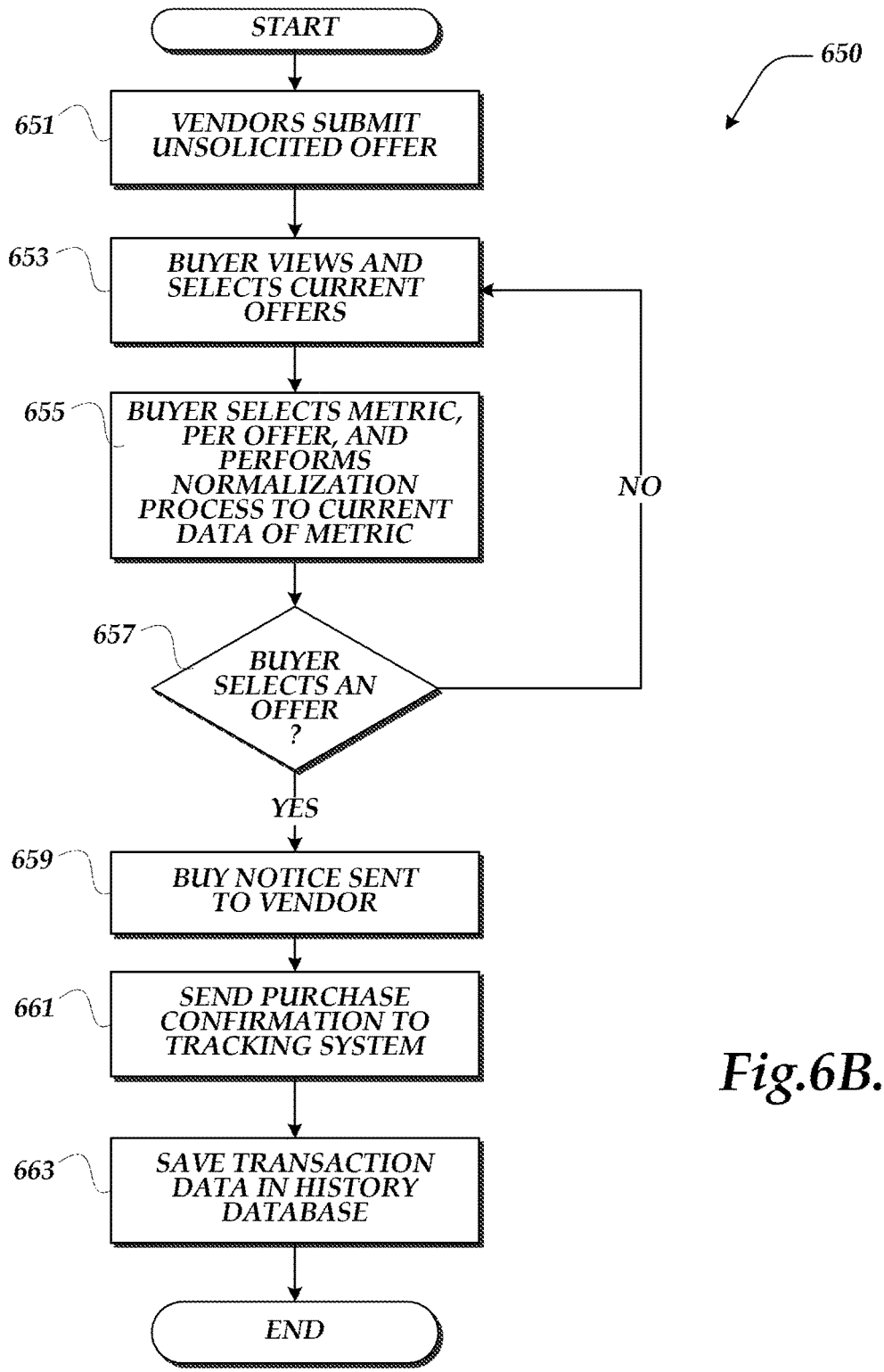

Referring now to FIG. 6B, an embodiment of the unsolicited offer process 650 is disclosed. In summary, the unsolicited offer process 650, also referred to as the unsolicited market purchase process, allows at least one buyer to view unsolicited offers from a plurality of vendors and purchase items from a plurality of vendors from the offers. The logic of FIG. 6B provides buyers with a forum that automatically manages, collects, and normalizes price quotes based on metric data. By the price normalization method of FIG. 6B, the server 230 creates an integrated forum where offers for a plurality of inherently dissimilar products can be obtained and normalized for determination of a purchase.

The unsolicited offer process 650 begins at step 651 where the plurality of vendors is able to submit offers to the server 230. This part of the process is executed in a manner similar to step 603 of FIG. 6A, where the vendor submits a quote to the server 230. However, in the Web page of step 651, the server 230 generates a Web page containing several tallies from many different vendors. In addition, at step 651, the server 230 stores all of the unsolicited offer data provided by the vendors.

Next, at step 653, a buyer views the offers stored on the server 230. This part of the process is carried out in a manner similar to the process of step 603 or 607 where the server 230 displays a plurality of offers similar to the tallies depicted in FIG. 8A.

Next, at step 655, the buyer selects a metric for the calculation of the normalized price associated with the selected offer. As described in more detail below, metric data may come from publicly available information, i.e., price of futures contracts traded on the Chicago Mercantile Exchange, subscription services such as Crowes™ or Random Lengths™ processed via the metric server adapter 435 (shown in FIG. 4), or internally generated metrics derived from the data stored in the server 230. The normalization calculation, otherwise referred to as the normalization process, occurs each time the buyer views a different offer, and the normalization calculation uses the most current metric data for each calculation. The normalization process is carried out because each vendor will most likely offer products that may vary from products of other vendors and have a different tally configuration from those supplied by other vendors. The normalization of the metric pricing allows the buyers to compare the relative value of the different products offered by the number of vendors. The metric price for each selected offer is displayed in a similar manner as the metric price 815 and 816 shown in the Web page of FIG. 8B.

Next, at decision block 657, the buyer selects at least one offer for purchase. This is similar to the process of FIG. 6A in that the buyer selects the "Buy!" hyperlink 820 associated with the desired tally to purchase an order. The process then continues to steps 659-663, where, at step 659, the process transmits a buy notice to the vendor, then, at step 661, sends a purchase confirmation to the tracking system, and then, at step 663, saves the transaction data in the server database. The steps 659-663 are carried out in the same manner as the steps 615-619 of FIG. 6A. In the above-described process, the buyer notification may include all of the information regarding the specifications by RFQ Line Item, and data such as, but not limited to, the buy price, date, and method of shipment, and the payment terms.

Figure 7:
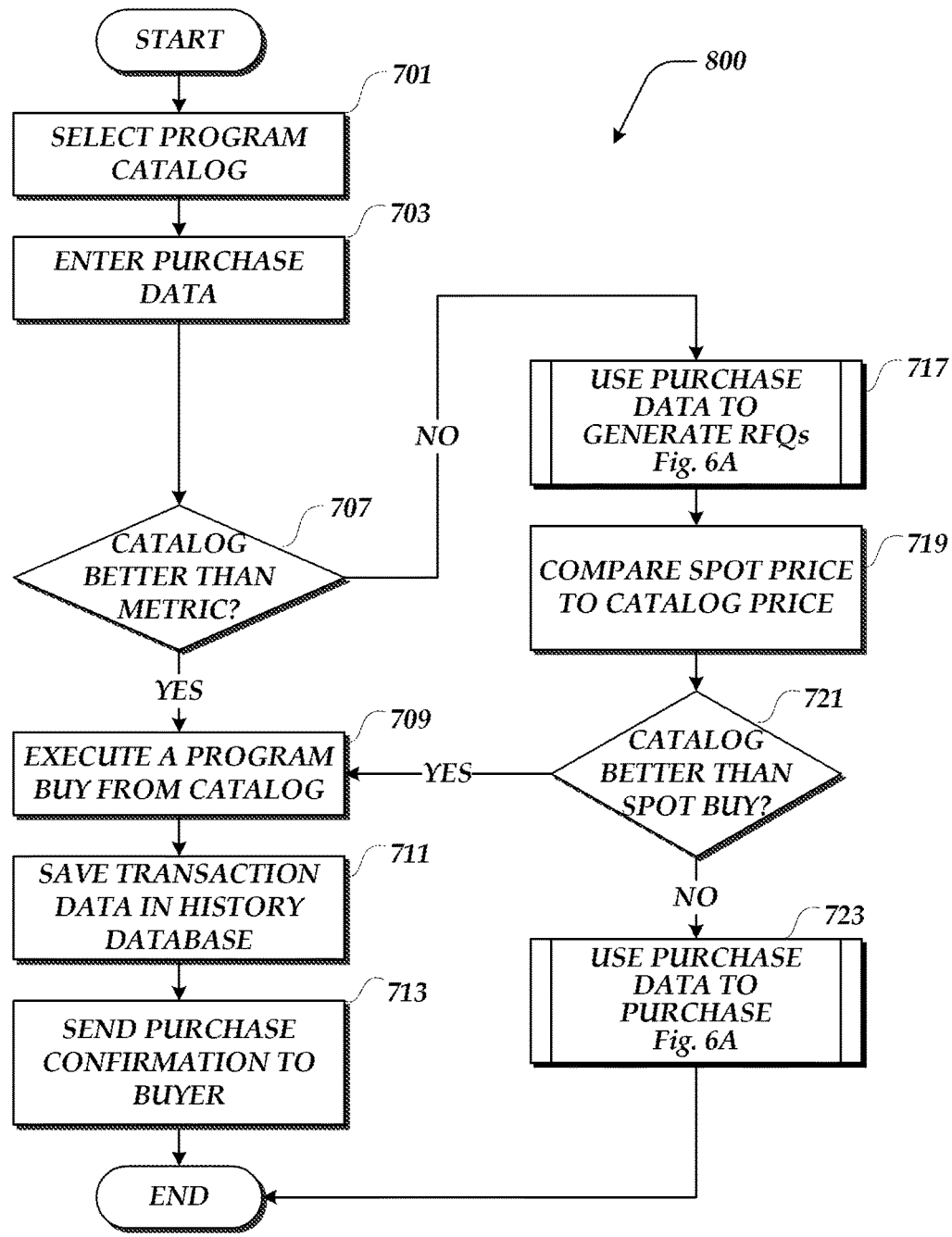
FIG. 7 is a flow diagram illustrating another embodiment of the logic used by the information server to execute the process of a catalog purchase.

Referring now to FIG. 7, a flow diagram illustrating yet another embodiment of the present disclosure is shown. FIG. 7 illustrates the catalog purchase process 700. This embodiment allows buyers to search for a catalog price of desired commerce items, enter their purchase data based on the pre-negotiated catalog prices, and to compare those catalog prices with a selected metric price and the current market price, wherein the current market price is determined by the purchase-negotiation process 600.

The process starts at step 701 where the buyer selects a program buy catalog 443. The program buy catalog 443 provides buyers with the published or pre-negotiated price of the desired products. Next, at step 703, based on the catalog information, the buyer then enters their purchase data. Similar to step 501 of FIG. 5 and the tally shown in FIG. 8A, the buyer sends purchase data to the server 230, such as the desired quantity of each item and the lumber species, grade, etc.

The process then proceeds to decision block 707 where the buyer makes a determination of whether to purchase the items using the catalog price or purchase the desired product in the open market. Here, the server 230 allows the user to make this determination by displaying the metric price of each catalog price. This format is similar to the metric price 815 and 816 displayed in FIG. 8B.

At decision block 707, if the buyer determines that the catalog price is better than a selected metric price, the process then proceeds to steps 709, 711, and 713, where a program buy from the catalog is executed, and the buyer's purchase information is stored on the server 230 and sent to the vendor's system to confirm the sale. These steps 711-713 are carried out in the same manner as the confirmation and save steps 617 and 619 as shown in FIG. 6A.

At decision block 707, if the buyer determines that the metric price is better than the catalog price, the process continues to step 717 where the buyer's purchase data is entered into an RFQ. At this step, the process carries out the first five steps 601-609 of the method of FIG. 6A to provide buyers with the price data from the open market, as well as provide the normalized prices for each open market quote. At step 719, the server 230 then displays a Web page that allows the user to select from a purchase option of a catalog or spot (market) purchase. At decision block 721, based on the displayed information, the buyer will then have an opportunity to make a determination of whether they will proceed with a catalog purchase or an open market purchase.

At decision block 721, if the buyer proceeds with the catalog purchase, the process continues to step 709 where the catalog purchase is executed. Steps 709-713 used to carry out the catalog purchase are the same as if the buyer had selected the catalog purchase in step 707. However, if at decision block 721 the buyer selects the option to proceed with the market purchase, the process continues to step 723 where the RFQ generated in step 717 is sent to the vendor. Here, the process carries out the steps of FIG. 6 to complete the open market purchase. More specifically, the process continues to step 609 where the buyer compares the normalized prices from each vendor. Once a vendor is selected, the negotiation process of steps 603-613 is carried out until the buyer decides to execute the purchase. Next, the transaction steps 615-619 are carried out to confirm the purchase, notify the tracking system, and save the transactional data on the historical database.

Optionally, the process can include a step where the server 230 stores all of the information related to program buy and metric comparisons and the final sales transaction in a historical database. This would allow the server 230 to use all of the transaction information in an analysis process for providing an improved method of obtaining the value of the program. Although the illustrated embodiment is configured to store the data related to the sales transactions, the system can also be configured to store all of the iterative quote information exchanged between the buyer and vendor.

The analysis process allows the server 230 to utilize the sales history records stored in steps 619 and 711 to generate price reports for communication to various third parties as well as provide a means of calculating current market prices for products sold in the above-described methods. The sales history records are also used as the source for a metric, such as those used in the process of FIGS. 6A, 6B, and 7. As shown in steps 619, 663, and 711, the server 230 continually updates the historical database for each sales transaction. The analysis reporting process allows a buyer or manager of buyers to conduct analysis on the historical information. This analysis would include multi-value cross compilation for purposes of determining purchasing strategies, buyer effectiveness, program performance, vendor performance, and measuring effectiveness of forward pricing as a risk management strategy.

Figure 9:
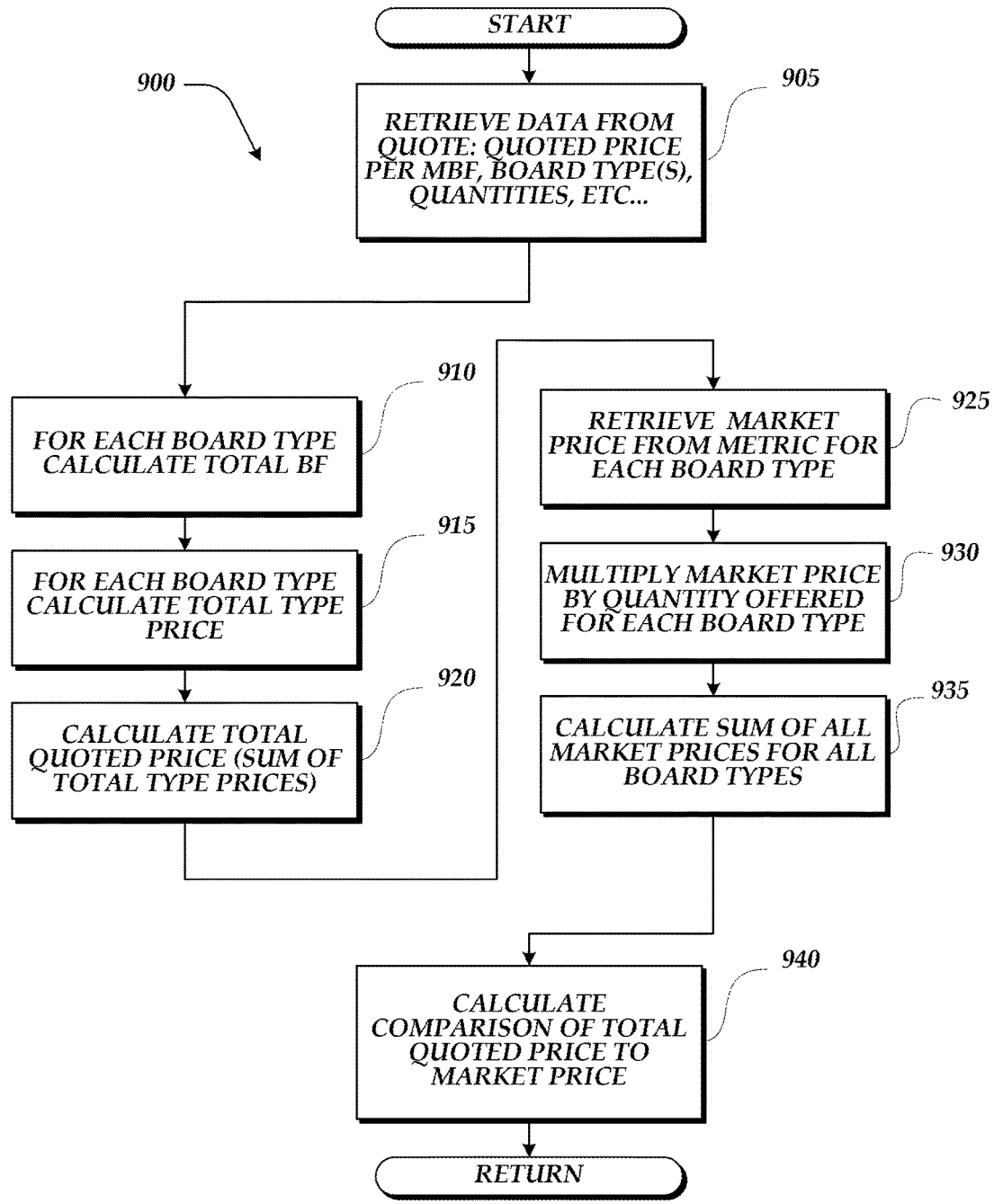
FIG. 9 is a flow diagram illustrating one embodiment of the normalization process described herein.

Referring now to FIG. 9, a flow diagram illustrating the logic of the normalization process 900 is shown. The logic of the normalization process 900 resides on the server 230 and processes the quotes received from commodity sellers. The logic begins at step 905 where quote data is obtained from the seller in response to the buyer's RFQ as described above.

Next, at step 910, routine 900 iteratively calculates the board footage (BF) of each type of lumber. Once all the totals are calculated for each type, routine 900 continues to step 915 where the server 230 calculates the total type price.

At step 915, routine 900 iteratively calculates the total type price for the amount of each type of lumber specified in the quote. This is accomplished by taking the total board footage (BF) calculated in block 910 and multiplying the total BF by the price per MBF specified in the quote. Once all the prices are calculated for each type, routine 900 continues to step 920 where the server 230 calculates the total quoted price. At step 920, the routine 900 calculates the total price for the quote by summing all of the total type prices calculated at step 915.

At step 925, the routine 900 iteratively retrieves the most current price for each type of lumber specified in the quote from a predefined metric source(s). Metric data may come from publicly available information, i.e., price of futures contracts traded on the Chicago Mercantile Exchange, subscription service publications such as Crowes™ or Random Lengths™ processed via the metric server adapter 435 (shown in FIG. 4), or internally generated metrics derived from the server database. Once all the prices are retrieved for each type, at step 930, the routine 900 then iteratively calculates the market price for the quantity of each type of lumber in the quote. Once the totals for all types are calculated, the routine 900 continues to step 935 where the routine 900 calculates the total market price for the quote by summing all the most current prices calculated in step 930. Although this example illustrates that steps 910-920 are executed before steps 925-935, these two groups of steps can be executed in any order, or in parallel, so long as they are both executed before a comparison step 940.

At step 940, routine 900 compares the total quoted to the metric price to arrive at a comparative value. In one exemplary embodiment of the current invention, the comparative value is a "percent of metric" value. A value higher than one hundred (100) percent indicates a price that is above the metric rate, and a lower percent indicates a price that is below the metric rate.

The operation of routine 900 can be further illustrated through an example utilizing specific exemplary data. In the example, a buyer sends out a request for a quote (RFQ) requesting a lot of 2×4 S&B lumber consisting of five units of 2"×4"×8', two units of 2"×4"×14', and five units of 2"×4"×16'. The buyer then receives quotes from three sellers. Seller A responds with a tally of six units of 2"×4"×8', four units of 2"×4"×14', and three units of 2"×4"×16' for $287 per thousand board feet. Seller B responds with a lot of five units of 2"×4"×8', one unit of 2"×4"×14', and six units of 2"×4"×16' for $283 per thousand board feet. Seller C responds with a lot of one unit of 2"×4"×8', five units of 2"×4"×14', and five units of 2"×4"×16' for $282 per thousand board feet. Suppose also that the typical unit size is 294 pieces/unit, and the metric or reported market price for 2"×4"×8's is $287.50, for 2"×4"×14's is $278.50, and for 2"×4"×16' is $288.

Viewing the MBF prices for the respective quotes is not particularly informative, given that certain lengths of lumber are more desirable and priced accordingly in the marketplace. By processing the quote from Seller A using routine 900, we arrive at a total MBF of 29.792, giving a total quoted price of $8,550.30. The selected metric price for the same types and quantities of lumber would be $8,471.12; therefore, the quoted price would have a percent of market value of 100.93%. Processing the quote from Seller B using routine 900, we arrive at a total MBF of 29.400, giving a total quoted price of $8,320.20. The selected metric price for the same types and quantities of lumber, however, would be $8,437.21; therefore, the quoted price would have a percent of market value of 98.61%. Finally, processing the quote from Seller C using routine 900, we arrive at a total MBF of 30.968, giving a total quoted price of $8,732.98. The selected metric price for the same types and quantities of lumber, however, would be $8,767.66; therefore, the quoted price would have a percent of market value of 99.38%. By looking at the percent of selected metric value, it is apparent that the price from Seller B is a better value. As shown in the methods of FIGS. 5-7, this price normalization process allows users to compare inherently different offers having different quality and quantity values.

In yet another example of an application of the normalization process, additional exemplary data is used to demonstrate the analysis of a transaction having one RFQ from a buyer and two different quotes from a seller, normalized to comparable product of another species. In this example, the buyer produces an RFQ listing the following items: one carload of Eastern SPF (ESPF) lumber having four units of 2"×4"×8', four units of 2"×4"×10', six units of 2"×4"×12', two units of 2"×4"×14', and six units of 2"×4"×16'. The vendor then responds with two different quotes with two different unit tallies and two different prices. The first response lists a quote price of $320 per thousand board feet, and a slight modification of the tally provides four units of 2"×4"×8', four units of 2"×4"×10', six units of 2"×4"×12', three units of 2"×4"×14', and five units of 2"×4"×16'. The second response quotes per the requested tally at a price of $322 per thousand board feet. Both quotes list the delivery location as "Chicago."

Figure 8C:
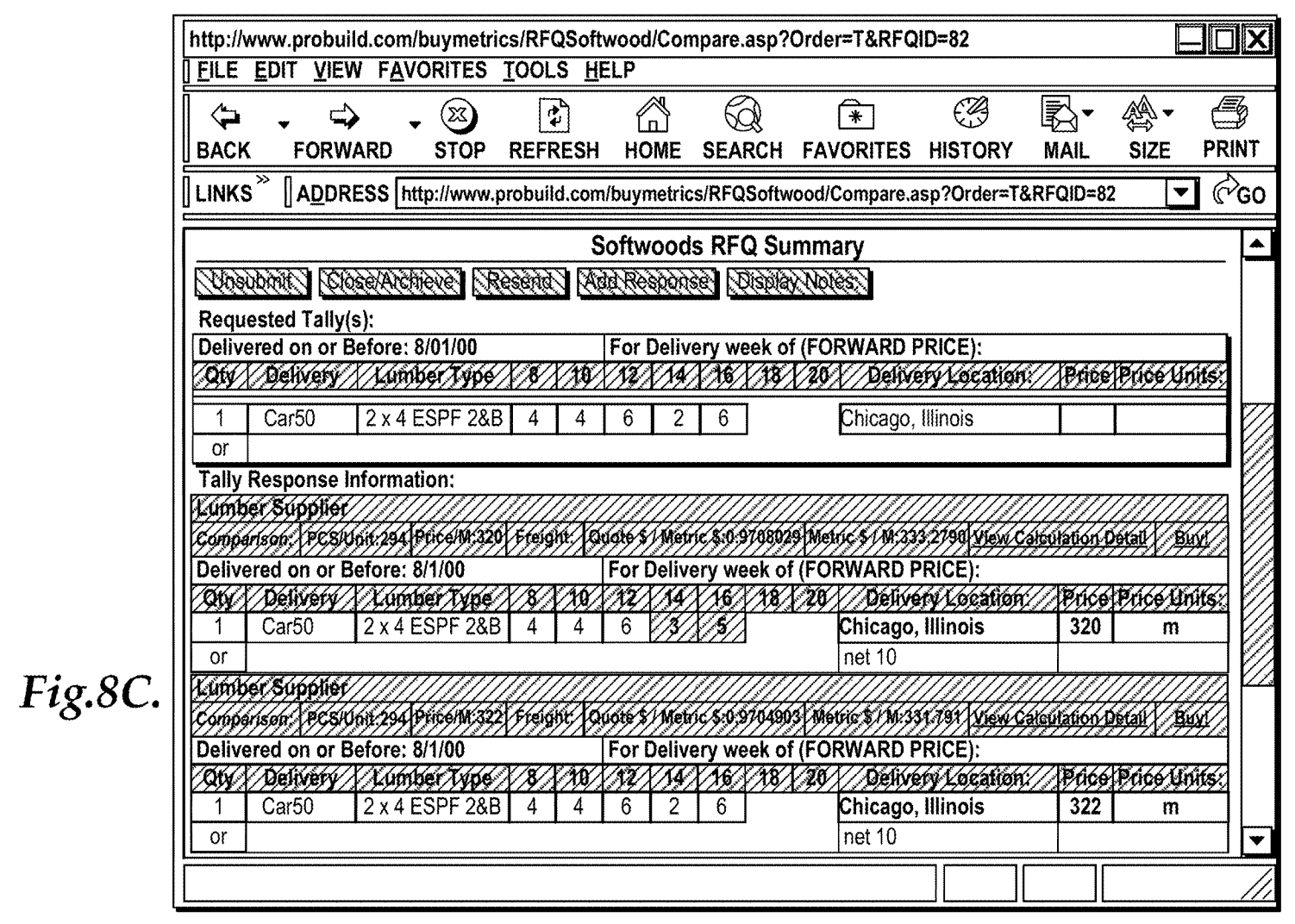
Figure 8D:
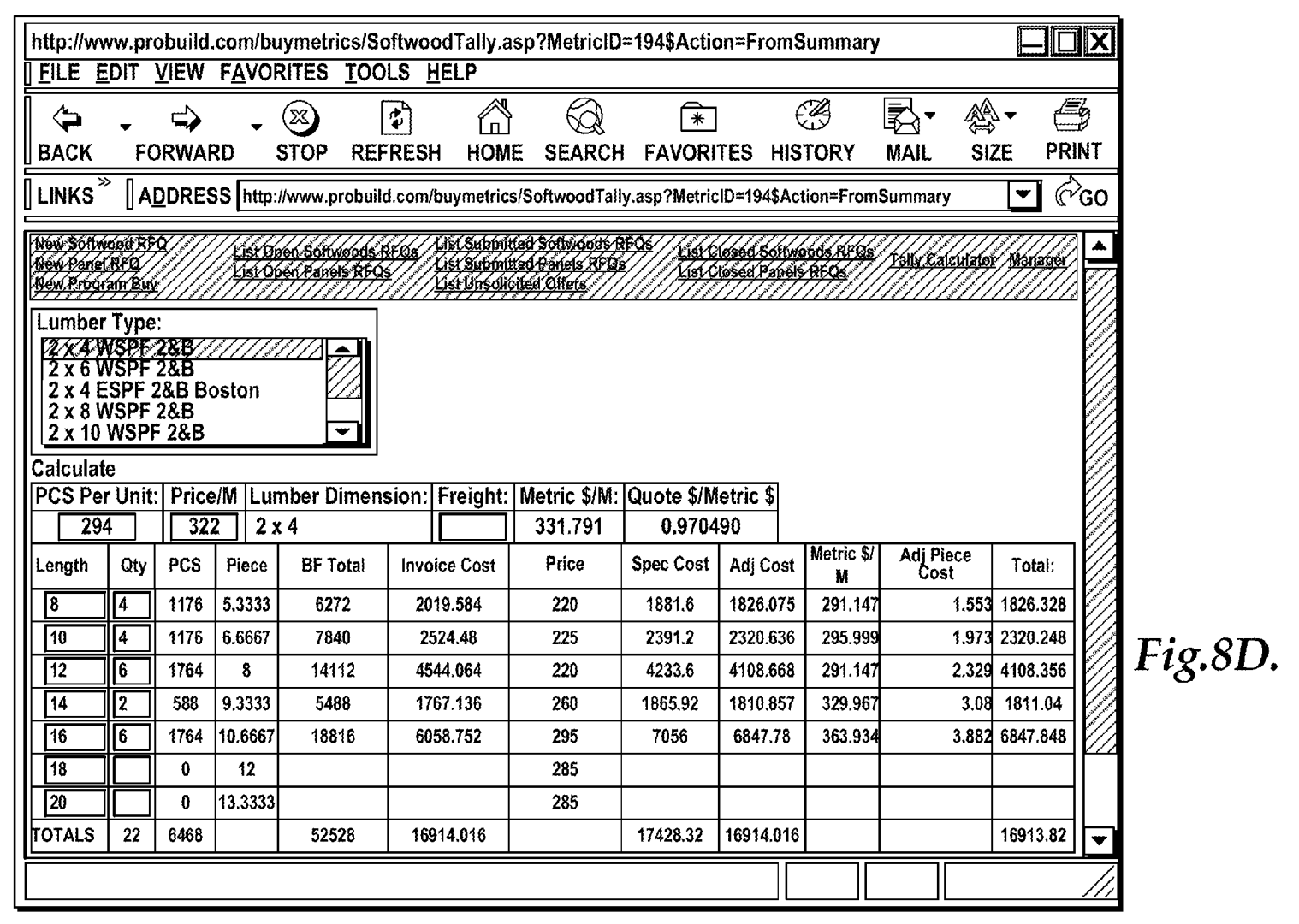

To display the quotes, the server 230 produces a Web page similar to that displayed in FIG. 8C, where the vendor's modified tally is displayed in highlighted text. The buyer can then view a summary metric comparison or select the hypertext link "View Calculation Detail," which then invokes the server 230 to produce a Web page as shown in FIG. 8D. Referring now to the Web page illustrated in FIG. 8D, the data produced by the server 230 compares the response to a selected metric of a different species, Western SPF (WSPF), for items of the same size, grade, and tally. The market price for the same 2×4 tally of ESPF and WSPF are thus simultaneously compared. In an example, Eastern quoted at $322 per thousand board feet, Western metric (Random Lengths™ 6/26/2000 print price plus freight of $80/M as defined in Metric Manager) for the same tally being $331.791. This metric comparison is also represented as Quote/Metric Value or Eastern price representing .970490, or 97% of comparable Western product.

In review of the normalization process, the buyer must select a metric source for price information for a defined item given a set of attributes, i.e., grade, species, and size. The metric may then be mapped to the RFQ item for comparison and does not have to be the equivalent of the item. For instance, as explained in the above-described example, it may be desirable to map the market relationship of one commodity item to another. The most current pricing data for the metric is electronically moved from the selected source to the server 230. As mentioned above, metric data may come from publicly available information, (i.e., price of futures contracts traded on the Chicago Mercantile Exchange), or subscription services, (i.e., Crowes™ or Random Lengths™ publications), or be an internal metric generated by the server 230. This metric data is used in the normalization process for all calculations, as described with reference to the above-described methods.

While various embodiments of the invention have been illustrated and described, it will be appreciated that within the scope of the appended claims, various changes can be made therein without departing from the spirit of the invention. For example, in an agricultural commodity, an order for Wheat U.S. #2 HRW could be compared to a selected metric of Wheat U.S. #2 Soft White, similar to how different species are analyzed in the above-described example.

The above system and method can be used to purchase other commodity items, such as in the trade of livestock. In such a variation, order information such as a lumber tally would be substituted for a meat type, grade, and cut. Other examples of commodity items include agricultural products, metals, or any other items of commerce having several order parameters.

The invention claimed is:

1. In a networked environment, a system comprising:
at least one server that includes:
  a network interface;
  a non-transitory computer-readable medium having computer-executable instructions stored thereon, wherein the computer-executable instructions, when executed, implement components including at least:
    a metric server adapter; and
    a metrics application; and
  a processor in communication with the network interface and the computer-readable medium, wherein the processor is configured to execute the computer-executable instructions stored in the computer-readable medium;
wherein:
the metric server adapter includes governing logic programmed to manage at least one evaluation service and a plurality of predefined instructions that pertain to the at least one evaluation service and/or data used to provide the at least one evaluation service;
the metrics application includes one or more production applications or modules programmed to manage one or more purchase and/or analysis processes, to execute the at least one evaluation service in coordination with the metric server adapter, and to manage one or more user interfaces that, in operation, facilitate interactions with the at least one server; and
in operation, the at least one server is configured to receive from at least one computing device in communication with the at least one server, or retrieve from at least one data source accessible to the at least one server, a plurality of price data sets, wherein each price data set comprises an offer to buy or sell that identifies price data for at least one item possessing a plurality of attributes that include two or more parameter values or a plurality of items having attributes that differ by at least one parameter value, and wherein at least one price data set represents an unequal offer in that the price data set identifies at least one item that differs by at least one parameter value from the item as identified in another price data set; and
wherein in response to the receipt or retrieval of at least one price data set, the at least one server implements the at least one evaluation service, which causes the metrics application, for each price data set, to:
  obtain time-dependent metric data from at least one data source accessible to the at least one server, wherein the obtained metric data includes market reference price data for one or more responsive items possessing attributes that are responsive to attributes of a respective item identified in the price data set, wherein each responsive item in the metric data possesses a plurality of attributes that include at least one parameter value;
  evaluate the plurality of attributes of each responsive item in the metric data relative to the attributes for the respective item identified in the price data set to dynamically discover relationships within the attributes, wherein discovery of a relationship comprising a difference is disclosed to the metric server adapter which enables the metric server adapter to define offer-specific instructions for adapting the metric data for the respective item;

normalize the metric data by executing the offer-specific instructions for adapting the metric data for the respective item, wherein execution of at least one offer-specific instruction causes one or more adjustment values to be generated and applied to the market reference price data for at least one responsive item that differs by at least one parameter value from the respective item as identified in the price data set, transforming the market reference price data for the at least one responsive item and automatically producing one or more offer-specific market reference price data values for the respective item; and generate at least one comparative metric that pertains to the at least one evaluation service, wherein the comparative metric is based, at least in part, on one or a combination of the offer-specific market reference price data values produced for the respective item or items identified in a price data set, the at least one comparative metric comprising a differential ratio or index value that compares the price data identified for the item or items in the offer with the offer-specific market reference price data values produced for the item or items.

2. The system of claim 1, wherein at least one of the plurality of received or retrieved price data sets identifies an item that is not a perfect substitute for the item as identified in another received or retrieved price data set, wherein the item is an alternate or substitute item with attributes that differ by one or more parameter values from the item as identified in another received or retrieved price data set.

3. The system of claim 1, wherein the differential ratio or index value is a measure of offer price in relation to market value that reduces the complexity of comparing unequal offers, wherein an offer-to-sell with a lowest differential ratio or index value represents an optimal opportunity to buy the respective item or items, and wherein an offer-to-buy with a highest differential ratio or index value represents an optimal opportunity to sell the respective item or items.

4. The system of claim 3, wherein at least one offer that is an offer-to-buy is compared to at least one offer that is an offer-to-sell.

5. The system of claim 1, wherein implementation of the at least one evaluation service and/or execution of at least one predefined instruction that pertains to the at least one evaluation service causes the metrics application to compare two or more of the received or retrieved price data sets, including at least one unequal offer, using at least one comparative metric generated for each price data set, wherein a result of the comparison is exposed to one or more computing devices in communication with the at least one server.

6. The system of claim 5, wherein selection by the user-agent of a predefined link that was pre-associated with at least one price data set identified in the exposed comparison causes the metrics application to automatically transmit, on behalf of the user-agent, at least one buy or sell notice for the at least one item associated with the link, via the network interface, to the computing device from which the price data set was received.

7. The system of claim 1, wherein the metrics application algorithmically processes the attributes to dynamically identify at least one relationship comprising a difference, wherein the identified relationship comprising a difference can include a new or previously unknown relationship, and wherein coordinated operation of the metrics application and the metric server adapter enables the metrics application to produce the one or more offer-specific market reference price data values for the respective item as identified in the price data set without relying on a predefined model having predefined relations that remain fixed within the model.

8. The system of claim 1, wherein the metric server adapter algorithmically processes the plurality of predefined instructions, the plurality of attributes and parameter values identified for the respective item, and the at least one discovered relationship comprising a difference, to ascertain which of the plurality of predefined instructions are applicable to the responsive item in order to contextually align the responsive item with the respective item, wherein the offer-specific instructions defined by the metric server adapter represent an evolved set of instructions that comprise more than a filtered subset of the predefined instructions.

9. The system of claim 1, wherein the predefined instructions that pertain to the at least one evaluation service include one or more industry-specific instructions or one or more instructions predefined for at least one particular user-agent, wherein the coordinated operation of the metrics application and the metric server adapter enables the at least one server to provide an evaluation service that is customized for the particular user-agent or the specific industry without custom-coding the computer-executable instructions.

10. The system of claim 1, wherein the predefined instructions that pertain to the at least one evaluation service were not predefined for, or pre-mapped to, a particular price data set.

11. The system of claim 1, wherein the metric server adapter is programmed to coordinate a conditional execution, by the metrics application, of the offer-specific instructions for adapting the metric data for the respective item.

12. The system of claim 11, wherein a conditional execution of the offer-specific instructions is expressed as "IF condition THEN action," or is priority weighted, recursive, or subject to another method of control defined by the metric server adapter.

13. The system of claim 11, wherein one or more offer-specific instructions for adapting the metric data for the respective item specify validation rules and/or predefined statistical criteria to be satisfied, and wherein a conditional execution of the offer-specific instructions causes the metrics application to produce the one or more offer-specific market reference price data values for the respective item when after the adjustment values resulting from the offer-specific instructions have been applied and the specified validation rules and/or predefined statistical criteria have been satisfied.

14. The system of claim 1, wherein the one or more identified parameter values include at least one of a grade, a rating measure, a species, an item type, a brand, a size, a unit of measure, a tally, a shipping or receiving location, a method of delivery, a delivery date, a time of service, a warranty, a payment term, or a transaction type.

15. The system of claim 14, wherein the delivery date or time of service specifies one or more fulfillment dates in the future, and comprises a forward price transaction type.

16. The system of claim 14, wherein delivery comprises a financial delivery.

17. The system of claim 14, wherein delivery comprises an exchange of at least one item for at least one other item, and wherein the at least one other item differs by at least one parameter value from the at least one item.

18. The system of claim 1, wherein the time-dependent metric data includes metric data for one or more responsive items from a time or period of time that corresponds with the time or period of time of the respective item in the price data set, a predefined time, or a continuously sliding interval of time that represents a most current period of time.

19. The system of claim 1, wherein implementation of the at least one evaluation service and/or execution of at least one predefined instruction that pertains to the at least one evaluation service causes the metrics application to convert data defined by a unit-of-measure into standardized or common units of measure before producing the one or more offer-specific market reference price data values for the at least one item as identified in each price data set using data possessing consistent units of measure, wherein the transformation of the market reference price data for the at least one responsive item occurs independent of the unit-of-measure conversion of the data.

20. The system of claim 1, wherein implementation of the at least one evaluation service and/or execution of at least one predefined instruction that pertains to the at least one evaluation service causes the metrics application to obtain only metric data resulting from a computer-based interaction and/or to use only electronically-created metric data to produce the one or more offer-specific market reference price data values for the respective item, wherein the electronically-created metric data includes data comprising a timestamp that identifies a particular time or period of time and does not include human-reported transaction data or transaction data that was manually transcribed into a digital format.

21. In a networked environment, a method for evaluating unequal offers comprising:
receiving, at at least one server, a plurality of price data sets, wherein the at least one server is operating under control of computer-executable instructions that, when executed by a processor, implement components including at least a governing logic component and a production component, wherein each price data set comprises an offer to buy or sell that identifies price data for at least one item possessing attributes that include two or more parameter values or a plurality of items having attributes that differ by at least one parameter value, wherein at least one price data set represents an unequal offer in that the price data set identifies at least one item that differs by at least one parameter value from the item as identified in another price data set; and
wherein, for each received price data set, the method further comprises implementing, by the at least one server, at least one evaluation service that, in operation, includes:
obtaining, by the production component, time-dependent market-reference data from at least one data source accessible to the at least one server, wherein the market reference data includes market-reference price data for one or more responsive items possessing attributes that are responsive to attributes of a respective item identified in the price data set, wherein each responsive item possesses a plurality of attributes including at least one parameter value;
evaluating, by the production component, the plurality of attributes of each responsive item in the market reference data relative to the plurality of attributes for the respective item as identified in the price data set to dynamically discover relationships within the attributes, wherein discovery of a relationship comprising a difference is disclosed to the governing logic component which enables the governing logic component to define offer-specific instructions for adapting the market reference data for the respective item; and
normalizing the market reference data, wherein the production component executes the offer-specific instructions for adapting the market reference data for the respective item, wherein execution of at least one offer-specific instruction causes one or more adjustment values to be generated and applied to the market reference price data for at least one responsive item that differs by at least one parameter value from the respective item as identified in the price data set, transforming the market reference price data for the at least one responsive item and automatically producing one or more offer-specific market reference price data values for the respective item; and
generating, by the production component, at least one comparative metric that pertains to the at least one evaluation service, wherein the comparative metric is based, at least in part, on one or a combination of the offer-specific market reference price data values produced for the respective item or items identified in the price data set, the comparative metric comprising a differential ratio or index value that compares the price data identified for the item or items in the offer with the offer-specific market reference price data values produced for the item or items.

22. The method of claim 21, wherein implementation of the at least one evaluation service and/or execution of at least one predefined instruction that pertains to the at least one evaluation service causes the production component to compare at least a subset of the received price data sets, including at least one unequal offer, using at least one comparative metric generated for each price data set, wherein a result of the comparison is exposed to one or more computing devices in communication with the at least one server.

23. The method of claim 21, wherein the differential ratio or index value is a measure of offer price in relation to market value that reduces the complexity of comparing unequal offers, wherein an offer-to-sell with a lowest differential ratio or index value represents an optimal opportunity to buy the respective item or items, and wherein an offer-to-buy with a highest differential ratio or index value represents an optimal opportunity to sell the respective item or items.

24. The method of claim 21, wherein the governing logic component includes one or more governing logic applications or modules programmed to manage the at least one evaluation service and a plurality of predefined instructions that pertain to the at least one evaluation service and/or data used to provide the at least one evaluation service.

25. The method of claim 24, further comprising, by the governing logic component, algorithmically processing the plurality of predefined instructions that pertain to the at least one evaluation service, the plurality of attributes and parameter values identified for the respective item, and the at least one discovered relationship comprising a difference, to ascertain which of the plurality of predefined instructions are applicable to the responsive item in order to contextually align the responsive item with the respective item, wherein the offer-specific instructions defined by the governing logic component represent an evolved set of instructions that comprise more than a filtered subset of the predefined instructions.

26. The method of claim 24, wherein the predefined instructions that pertain to the at least one evaluation service include one or more industry-specific instructions or one or more instructions predefined for at least one particular user-agent, wherein the coordinated operation of the production component and the governing logic component enables the at least one server to provide an evaluation service that is customized for the particular user-agent or the specific industry without custom-coding the computer-executable instructions that comprise the production component.

27. The method of claim 26, wherein at least one predefined instruction that pertains to the at least one evaluation service and a particular user-agent or a specific industry, when executed, causes the production component to obtain metric data that is responsive to an alternate item, wherein the alternate item is a substitute item or an item possessing attribute data that differs by at least one parameter value from the respective item as identified in the price data set.

28. The method of claim 21, wherein the production component includes one or more applications or modules programmed to manage one or more purchase and/or analysis processes, to execute the at least one evaluation service in coordination with the governing logic component, and manage one or more user interfaces that, in operation, facilitate interactions with the at least one server.

29. The method of claim 21, wherein the production component algorithmically processes the attributes to dynamically identify at least one relationship comprising a difference, wherein the identified relationship comprising a difference can include a new or previously unknown relationship, and wherein coordinated operation of the production component and the governing logic component enables the metrics application to produce the one or more offer-specific market reference price data values for the respective item as identified in the price data set without relying on a predefined model having predefined relations that remain fixed within the model.

30. The method of claim 21, wherein the production component manages at least one user interface that, in operation, facilitates data communication in XML format, enabling the production component to dynamically change, dynamically route, and/or pre-configure the data for movement of the data in an integrated data exchange with another computing device in communication with the at least one server.

31. The method of claim 21, wherein the governing logic component coordinates a conditional execution, by the production component, of the offer-specific instructions for adapting the metric data for the respective item.

32. The method of claim 31, wherein a conditional execution of the offer-specific instructions is expressed as "IF condition THEN action," or is priority weighted, recursive, or is subject to another method of control defined by the governing logic component.

33. The method of claim 31, wherein one or more offer-specific instructions for adapting the metric data for the respective item specify validation rules and/or predefined statistical criteria to be satisfied, and wherein a conditional execution of the offer-specific instructions causes the production component to produce the one or more offer-specific market reference price data values for the respective item after the adjustment values resulting from the offer-specific instructions have been applied and the specified validation rules and/or predefined statistical criteria have been satisfied.

34. The method of claim 21, wherein the one or more identified parameter values include at least one of a grade, a rating measure, a species, an item type, a brand, a size, a unit of measure, a tally, a shipping or receiving location, a method of delivery, a delivery date, a time of service, a warranty, a payment term, or a transaction type.

35. The method of claim 34, wherein the delivery date or time of service specifies one or more fulfillment dates in the future, and comprises a forward price transaction type.

36. The method of claim 21, wherein implementation of the at least one evaluation service and/or execution of at least one predefined instruction that pertains to the at least one evaluation service causes the production component to convert data defined by a unit-of-measure into standardized or common units of measure before producing the one or more offer-specific market reference price data values for the at least one respective item, wherein the transformation of the market reference price data for the at least one responsive item occurs independent of the unit-of-measure conversion of the data.

37. The method of claim 21, wherein implementation of the at least one evaluation service and/or execution of at least one predefined instruction that pertains to the at least one evaluation service causes the production component to obtain only market-reference data resulting from a computer-based interaction and/or to use only electronically-created market-reference data to produce the one or more offer-specific market reference price data values for the respective item, wherein the electronically-created market-reference data includes data comprising a timestamp that identifies a particular time or period of time and does not include human-reported transaction data or transaction data that was manually transcribed into a digital format.

38. The method of claim 21, wherein the at least one item identified in the price data set represents a specific version or particular form of a physical product or raw material, an intangible product, a service, or a combination thereof.

39. In a networked environment, a non-transitory computer-readable medium having computer-executable instructions stored thereon, wherein the computer-executable instructions, when executed, cause at least one server to perform operations comprising:
receiving, at the at least one server, a plurality of price data sets, wherein the at least one server is operating under control of computer-executable instructions that, when executed by a processor, implement components including a governing logic component and a production component, wherein each price data set includes price data and represents an offer to buy or sell at least one identified item possessing attributes that include two or more parameter values or a plurality of items having attributes that differ by at least one parameter value, and wherein at least one price data set represents an unequal offer in that the price data set identifies at least one item that differs by at least one parameter value from the item as identified in another price data set; and
implementing at least one evaluation service wherein, for each received price data set, the computer-executable instructions cause the at least one server to:
obtain, by the production component, time-dependent market-reference data from at least one data source accessible to the at least one server, wherein the market reference data includes market-reference price data for one or more responsive items possessing attributes that are responsive to attributes of a respective item identified in the price data set, wherein each responsive item in the market-reference data possesses a plurality of attributes including at least one parameter value;

evaluate, by the production component, the plurality of attributes of each responsive item in the market reference data relative to the plurality of attributes for the respective item as identified in the price data set to dynamically discover relationships within the attributes, wherein discovery of a relationship comprising a difference is disclosed to the governing logic component which enables the governing logic component to define offer-specific instructions for adapting the market reference data for the respective item;

normalize the market reference data, wherein the production component executes the offer-specific instructions for adapting the market reference data for the respective item, wherein execution of at least one offer-specific instruction causes one or more adjustment values to be generated and applied to the market reference price data for at least one responsive item that differs by at least one parameter value from the respective item as identified in the price data set, transforming the market reference price data for the at least one responsive item and automatically producing one or more offer-specific market reference price data values for the respective item; and generate, by the production component, at least one comparative metric that pertains to the at least one evaluation service, wherein the comparative metric is based, at least in part, on one or a combination of the offer-specific market reference price data values produced for the respective item or items identified in the price data set, the comparative metric comprising a differential ratio or index value that compares the price data identified for the item or items in the offer with the offer-specific market reference price data values produced for the item or items.

40. The computer-readable medium of claim 39, wherein the computer-executable instructions cause the governing logic component, including one or more governing logic applications or modules, to manage the at least one evaluation service and a plurality of predefined instructions that pertain to the at least one evaluation service and/or data used to provide the at least one evaluation service.

41. The computer-readable medium of claim 40, wherein the computer-executable instructions cause the governing logic component to algorithmically process the plurality of predefined instructions, the plurality of attributes and parameter values identified for the respective item, and the at least one discovered relationship comprising a difference, to ascertain which of the plurality of predefined instructions are applicable to the responsive item in order to contextually align the responsive item with the respective item, wherein the offer-specific instructions defined by the governing logic component represent an evolved set of instructions that comprise more than a filtered subset of the predefined instructions.

42. The computer-readable medium of claim 39, wherein the computer-executable instructions cause the production component to manage one or more purchase and/or analysis processes, to execute the at least one evaluation service in coordination with the governing logic component, and manage one or more user interfaces that, in operation, facilitate interactions with the at least one server.

43. The computer-readable medium of claim 42, wherein the computer-executable instructions cause the production component to algorithmically processes the attributes to dynamically identify at least one relationship comprising a difference, wherein the identified relationship comprising a difference can include a new or previously unknown relationship, and wherein coordinated operation of the production component and the governing logic component enables the metrics application to produce the one or more offer-specific market reference price data values for the respective item as identified in the price data set without relying on a predefined model having predefined relations that remain fixed within the model.

44. The computer-readable medium of claim 39, wherein the computer-executable instructions cause the production component to compare at least a subset of the received price data sets, including at least one unequal offer, using at least a comparative metric generated for each price data set, wherein a result of the comparison is exposed to one or more computing devices in communication with the at least one server.

45. The computer-readable medium of claim 39, wherein the computer-executable instructions cause the production component to generate a differential ratio or index value that is a measure of offer price in relation to market value that reduces the complexity of comparing unequal offers, wherein an offer-to-sell with a lowest differential ratio or index value represents an optimal opportunity to buy the respective item or items, and wherein an offer-to-buy with a highest differential ratio or index value represents an optimal opportunity to sell the respective item or items.

* * * * *